(12) United States Patent
Reddy et al.

(10) Patent No.: US 12,234,402 B2
(45) Date of Patent: *Feb. 25, 2025

(54) MESOGEN COMPOUNDS

(71) Applicant: Transitions Optical, Ltd., Tuam (IE)

(72) Inventors: Ramaiahgari Reddy, Murrysville, PA (US); Alan M. Grubb, Pittsburgh, PA (US); Anil Kumar, Murrysville, PA (US); Yannian Li, Solon, OH (US); Suvagata Tripathi, Kent, OH (US)

(73) Assignee: Transitions Optical, Ltd., Tuam (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,415

(22) Filed: Aug. 16, 2023

(65) Prior Publication Data

US 2023/0383187 A1 Nov. 30, 2023

Related U.S. Application Data

(63) Continuation of application No. 17/312,219, filed as application No. PCT/EP2019/083829 on Dec. 5, 2019, now Pat. No. 11,773,326.

(51) Int. Cl.
*G02F 1/1333* (2006.01)
*C09K 19/20* (2006.01)
*C09K 19/30* (2006.01)
*C09K 19/04* (2006.01)

(52) U.S. Cl.
CPC ...... *C09K 19/3068* (2013.01); *C09K 19/2007* (2013.01); *C09K 2019/0448* (2013.01); *C09K 2019/2078* (2013.01); *C09K 2019/3004* (2013.01)

(58) Field of Classification Search
CPC ............ C09K 19/3068; C09K 19/2007; C09K 19/3001; C09K 2019/0448; C09K 2019/2078; C09K 2019/3004; C09K 2019/0444; G02F 1/1333
See application file for complete search history.

(56) References Cited

U.S. PATENT DOCUMENTS

| | | | |
|---|---|---|---|
| 7,094,360 B2 | 8/2006 | Wellinghoff et al. | |
| 7,910,019 B2 | 3/2011 | He et al. | |
| 7,910,020 B2 | 3/2011 | He et al. | |
| 8,349,210 B2 | 1/2013 | Xu et al. | |
| 8,628,685 B2 | 1/2014 | He et al. | |
| 8,828,284 B2 | 9/2014 | Carpenter | |
| 8,926,091 B2 | 1/2015 | Kumar et al. | |
| 9,334,439 B2 | 5/2016 | DeMeio et al. | |
| 9,683,102 B2 | 6/2017 | Cefalo et al. | |
| 2009/0326186 A1 | 12/2009 | He et al. | |
| 2012/0002141 A1 | 1/2012 | Dai et al. | |
| 2015/0234208 A1 | 8/2015 | De Ayguavives et al. | |
| 2017/0002268 A1 | 1/2017 | Adlem et al. | |
| 2017/0275534 A1 | 9/2017 | Reddy et al. | |
| 2018/0305619 A1 | 10/2018 | Wilkes et al. | |
| 2019/0292457 A1 | 9/2019 | Fiebranz et al. | |
| 2022/0049161 A1 | 2/2022 | Reddy et al. | |
| 2022/0275278 A1 | 9/2022 | Reddy et al. | |
| 2023/0383187 A1* | 11/2023 | Reddy | C09K 19/3068 |

FOREIGN PATENT DOCUMENTS

WO 2017067630 A1 4/2017

OTHER PUBLICATIONS

Wiegand et al., "Synthesis and characterization of triptycene-based polyimides with tunable high fractional free volume for gas separation membranes", Journal of Materials Chemistry A, 2014, pp. 13309-13320, vol. 2.

* cited by examiner

*Primary Examiner* — Geraldina Visconti
(74) *Attorney, Agent, or Firm* — The Webb Law Firm

(57) ABSTRACT

The present invention relates to mesogen compounds that include a first mesogen (Mesogen-1) and a second mesogen (Mesogen-2) that are connected by a linking group (-L-), as represented by the following Formula (I):

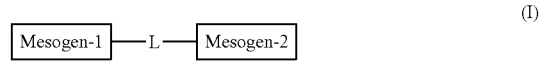

(I)

Mesogen-1, and optionally Mesogen-2, each independently include the following terminal group,

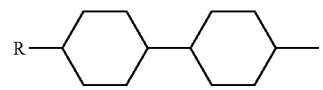

where R is hydrogen, alkyl, or alkoxy. Mesogen-2 optionally includes a terminal group P—, which is selected from R, acrylate, methacrylate, trihalomethacrylate, oxirane, hydroxyl, carboxylic acid, and carboxylic acid ester. Mesogen-1 and Mesogen-2 together include a total of at least seven, or at least eight, cyclic groups. In some cases, Mesogen-1 and Mesogen-2 are the same. The present invention also relates to liquid crystal compositions that include such mesogen compounds, and to optical elements that include such mesogen compounds.

13 Claims, No Drawings

MESOGEN COMPOUNDS

CROSS-REFERENCE TO RELATED APPLICATIONS

This application is a continuation of U.S. patent application Ser. No. 17/312,219 filed Dec. 5, 2019, which is the United States national phase of International Application No. PCT/EP2019/083829 filed Dec. 5, 2019, which claims priority to International Patent Application No. PCT/EP2018/084127 filed Dec. 10, 2018, the disclosures of which are hereby incorporated by reference in their entirety.

FIELD

The present invention relates to mesogen compounds that include first and second mesogens that are connected by a linking group, and which are optionally polymerizable, liquid crystal compositions that include such mesogen compounds, and to optical elements that include such mesogen compounds.

BACKGROUND

The molecules of a liquid crystal are typically capable of aligning with one another in substantially one direction, which results in a fluid material having anisotropic properties, such as with regard to optical, electromagnetic, and/or mechanical properties. A mesogen is typically described as the primary or fundamental unit (or segment or group) of a liquid crystal material that induces, and/or is induced into, structural order amongst and between liquid crystals (such as, other liquid crystal materials that are present).

Liquid crystal polymers are polymers capable of forming regions of highly ordered structure while in a liquid phase. Liquid crystal polymers have a wide range of uses, including engineering plastics, and gels for liquid crystal displays (LCD's). The structure of liquid crystal polymers can be described as being composed of densely packed elongated polymer chains that provide self-reinforcement almost to the melting point of the polymer.

Dichroism can occur in liquid crystals, including mesogen compounds, due to the optical anisotropy of the molecular structure, or the presence of impurities, or the presence of dichroic dyes and/or photochromic-dichroic materials. As used herein, the term "dichroism" and similar terms, such as "dichroic", means the ability to absorb one of two orthogonal plane polarized components of radiation (including transmitted and/or reflected radiation) more strongly than the other orthogonal plane polarized component. Photochromic-dichroic materials possess both photochromic properties and dichroic properties. A photochromic-dichroic material, in some instances, can be described as including a photochromic molecule (or core, or moiety) to which is covalently attached at least one lengthening group at least a portion of which is capable of being aligned with (or by) a mesogenic material.

When used in combination with liquid crystal materials, such as mesogen compounds, the dichroic properties of photochromic-dichroic compounds, such as polarization efficiency and absorption ratio, can be enhanced. While not intending to be bound by any theory, it is believed based on the evidence at hand, that alignment of the photochromic-dichroic compounds with aligned mesogen compounds enhances the dichroic properties of the photochromic-dichroic compounds, such as improved absorption ratio (AR) values.

The photochromic properties of photochromic-dichroic compounds can be enhanced by a chemical environment that allows the photochromic portion thereof to efficiently undergo a reversible conformational change between an absorbing (or colored state) and a non-absorbing (or non-colored state). Examples of quantifiable photochromic properties include, but are not limited to: fade rate (sometimes referred to as fade half-life, $T_{1/2}$); change in optical density (sometimes designated as $\Delta OD$); the change in optical density ($\Delta OD$) at saturation; sensitivity (sometimes designated as $\Delta OD/Min$); and the efficiency at which the photochromic compound absorbs radiation required to activate the photochromic compound (sometimes designated as chromaticity). The chemical environment provided by the aligned mesogen compounds, while enhancing dichroic properties of the dichroic portion of a photochromic-dichroic compound, can in some instances provide a chemical environment that restricts or limits the efficient reversible conformational change of the photochromic portion of the photochromic-dichroic compound.

It would be desirable to develop new mesogen compounds that are capable of further enhancing the dichroic properties of dichroic materials, such as photochromic-dichroic compounds. It would be further desirable that such newly developed mesogen compounds maintain or enhance the photochromic properties of photochromic-dichroic materials used in conjunction therewith.

SUMMARY

In accordance with the present invention, there is provided a mesogen-containing compound represented by the following Formula (I),

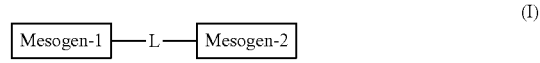

(I)

With reference to Formula (I),
  (A) Mesogen-1 is represented by the following Formula (II),

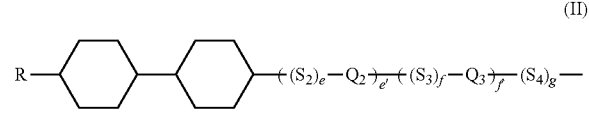

(II)

With reference to Formula (II),
  R is selected from hydrogen, alkyl, and alkoxy; and
  e' and f' for each occurrence for Formula (II), are independently from 0 to 4, provided the sum of e' and f' is at least 2.
With further reference to Formula (I),
  (B) Mesogen-2 is represented by Formula (II) of Mesogen-1, or the following Formula (III),

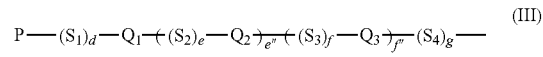

(III)

With reference to Formula (III),
  P is selected from R, acrylate, methacrylate, trihalomethacrylate, oxirane, hydroxyl, amino, carboxylic acid, and carboxylic acid ester;

d is 0 to 20;

S₁ independently for each d is selected from an S₁-spacer unit chosen from: —(CH₂)—; —(O)—; —C(O)—; and —NH—, provided that when two S₁-spacer units comprising heteroatoms are linked together, the S₁-spacer units are linked so that heteroatoms are not directly linked to each other;

Q₁ is a divalent group selected from the group consisting of: unsubstituted or substituted cycloaliphatic group; unsubstituted or substituted heterocycloaliphatic group; unsubstituted or substituted aryl; and unsubstituted or substituted heteroaryl; wherein the cycloaliphatic group substituents, heterocycloaliphatic group substituents, aryl substituents, and heteroaryl substituents are each independently selected from alkyl and halogen; and e" and f" for each occurrence for Formula (III), are independently from 0 to 6, provided the sum of e" and f" is at least 2.

Independently for each of Formula (II) and Formula (III), (i) Q₂ and Q₃ for each occurrence, are independently a divalent group selected from the group consisting of: unsubstituted or substituted cycloaliphatic group; unsubstituted or substituted heterocycloaliphatic group; unsubstituted or substituted aryl; and unsubstituted or substituted heteroaryl; wherein the cycloaliphatic group substituents, heterocycloaliphatic group substituents, aryl substituents, and heteroaryl substituents are each independently selected from alkyl and halogen;

(ii) S₂, S₃, and S₄ for each occurrence, are independently selected from a spacer unit chosen from: —(CH₂)—; —O—; —C(O)—; and —NH—; and (iii) e, f, and g for each occurrence, are independently 0 to 3, provided that when two spacer units comprising heteroatoms are linked together the spacer units are linked so that heteroatoms are not directly linked to each other.

With additional reference to Formula (I), (C) -L- is represented by the following Formula (IV), -(A-B)$_y$-E-    (IV)

With reference to Formula (IV), (i) y is 1 to 30;

(ii) each A independently for each y is a divalent group selected from the group consisting of aliphatic group and haloaliphatic group;

(iii) each B independently for each y is a divalent group selected from the group consisting of: —O—; —C(O)O—; —OC(O)O—; —C(O)N(R₁)— where R₁ is H or alkyl; —NH—C(O)O—; —N(R₂)C(O)N(R₂)— where each R₂ is independently selected from H or alkyl;

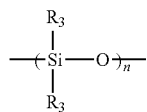

where n is 1 to 5, and each R₃ independently for each n is selected from methyl, ethyl, and phenyl; —Si(R₄)(R₄)— where each R₄ is independently selected from methyl, ethyl, and phenyl; unsubstituted or substituted cycloaliphatic groups; unsubstituted or substituted aryl; and unsubstituted or substituted —O-(Aryl)-O—; wherein the cycloaliphatic substituents, the aryl substituents, and —O-(Aryl)-O— substituents are each independently selected from alkyl, and —(S₁)$_d$—P, where S₁, d and P are each as defined with regard to Formula (III); and (iv) E is a divalent group selected from the group consisting of aliphatic group and haloaliphatic group.

In further accordance with the present invention, there is provided liquid crystal compositions that include the mesogen-containing compound of the present invention, such as described with reference to Formula (I).

There is provided, in further accordance with the present invention, an optical element that comprises: a substrate; and a layer on at least a portion of a surface of the substrate, in which the layer comprises the mesogen-containing compound of the present invention, such as described with reference to Formula (I).

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

DETAILED DESCRIPTION

As used herein, the articles "a", "an", and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

As used herein, unless otherwise indicated, left-to-right representations of linking groups, such as divalent linking groups, are inclusive of other appropriate orientations, such as, but not limited to, right-to-left orientations. For purposes of non-limiting illustration, the left-to-right representation of the divalent linking group

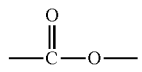

or equivalently —C(O)O— or —(O)CO—, is inclusive of the right-to-left representation thereof,

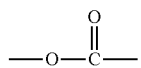

or equivalently —OC(O)— or —O(O)C—.

Other than in the operating examples, or where otherwise indicated, all numbers expressing quantities of ingredients, reaction conditions, and so forth used in the specification and claims are to be understood as modified in all instances by the term "about".

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (such as prepared from a single monomer species), copolymers (such as prepared from at least two monomer species), and graft polymers (including, but not limited to, star polymers and comb polymer).

As used herein, the term "(meth)acrylate" and similar terms, such as "(meth)acrylic acid ester", means methacrylates and/or acrylates. As used herein, the term "(meth) acrylic acid" means methacrylic acid and/or acrylic acid.

As used herein, the term "photochromic" and similar terms, such as "photochromic compound", means having an absorption spectrum for at least visible radiation that varies in response to absorption of at least actinic radiation. Further, as used herein, the term "photochromic material" means any substance that is adapted to display photochromic properties (such as adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state (such as a "clear state") to a second state (such as a "colored state") in response to actinic radiation, and reverting back to the first state in response to thermal energy. The term "non-thermally reversible photochromic compounds/materials" as used herein means compounds/materials capable of converting from a first state (such as a "clear state") to a second state (such as a "colored state") in response to actinic radiation, and reverting back to the first state in response to actinic radiation of substantially the same wavelength(s) as the absorption(s) of the colored state.

As used herein, to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, the photochromic compounds used in conjunction with the present invention can have a different absorption spectrum in each of the first and second state. For example, while not limiting herein, a photochromic compound used in conjunction with the present invention can be clear in the first state and colored in the second state. Alternatively, a photochromic compound used in conjunction with the present invention can have a first color in the first state and a second color in the second state. Additionally, a photochromic-dichroic compound used in conjunction with the present invention can have a first alignment in a first state, and a second alignment in a second state, in which one of the first alignment and second alignment is substantially non-aligned.

As used herein, the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein, the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including, without limitation, contact lenses, intraocular lenses, magnifying lenses, and protective lenses or visors.

As used herein, the term "display" means the visible or machine-readable representation of information in words, numbers, symbols, designs or drawings. Non-limiting examples of display elements include screens, monitors, and security elements, such as security marks.

As used herein, the term "window" means an aperture adapted to permit the transmission of radiation therethrough. Non-limiting examples of windows include automotive, marine, rail, and aircraft transparencies; windshields; filters; shutters; and optical switches.

As used herein, the term "mirror" means a surface that specularly reflects a large fraction of incident light.

As used herein, the term "liquid crystal cell" refers to a structure containing a liquid crystal material that is capable of being ordered. A non-limiting example of a liquid crystal cell element is a liquid crystal display.

As used herein, the terms "formed over", "deposited over", "provided over", "applied over", "residing over", or "positioned over", mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

As used herein, the term "aliphatic" and related terms, such as "aliphatic group(s)", means non-cyclic and non-aromatic hydrocarbon groups, which include at least one carbon atom, such as 1 to 20 carbon atoms, such as $C_1$-$C_{20}$ aliphatic groups, or $C_1$-$C_{10}$ aliphatic groups, or $C_1$-$C_6$ aliphatic groups; can be linear or branched; optionally include one or more interior and/or terminal alkene (or alkenyl) groups; and optionally include one or more interior and/or terminal alkyne (or alkynyl) groups. When including two or more alkene groups, the alkene groups of an aliphatic group can be conjugated and/or non-conjugated. When including two or more alkyne groups, the alkyne groups of an aliphatic group can be conjugated and/or non-conjugated. When including at least one alkene group and at least one alkyne group, the alkene and alkyne groups of the aliphatic group can be conjugated and/or non-conjugated relative to each other.

Examples of aliphatic groups include, but are not limited to, alkyl groups. As used herein, the term "alkyl" and related terms, such as "alkyl group(s)", means groups which include at least one carbon atom, such as 1 to 20 carbon atoms, such as $C_1$-$C_{20}$ alkyl groups, or $C_1$-$C_{10}$ alkyl groups, or $C_1$-$C_6$ alkyl groups; are linear or branched; and are saturated (and correspondingly are free of alkene groups and alkyne groups). Examples of alkyl groups include, but are not limited to, methyl, ethyl, n-propyl, iso-propyl, n-butyl, iso-butyl, sec-butyl, t-butyl, linear or branched pentyl, linear or branched hexyl, linear or branched heptyl, linear or branched octyl, linear or branched nonyl, linear or branched decyl, linear or branched undecyl, linear or branched dodecyl, linear or branched tridecyl, linear or branched tetradecyl, linear or branched pentadecyl, linear or branched hexadecyl, linear or branched heptadecyl, linear or branched octadecyl, linear or branched nonadecyl, and linear or branched eicosanyl.

As used herein, recitations of "linear or branched" groups, such as, but not limited to, linear or branched alkyl, are herein understood to include, for purposes of no-limiting illustration, a methylene group or a methyl group; groups that are linear, such as linear $C_2$-$C_{20}$ alkyl groups; and groups that are appropriately branched, such as, but not limited to, branched $C_3$-$C_{20}$ alkyl groups.

Examples of aliphatic groups include, but are not limited to, alkenyl groups. As used herein, the term "alkenyl" and related terms, such as "alkenyl groups", means groups which include at least two carbon atoms, such as 2 to 20 carbon atoms, such as $C_2$-$C_{20}$ alkenyl groups, or $C_2$-$C_{10}$ alkenyl groups, or $C_2$-$C_6$ alkenyl groups; are linear or branched; and include one or more interior and/or terminal alkene (or alkenyl) groups. Examples of alkenyl groups include, but are not limited to, those examples of linear or branched alkyl groups recited previously herein, which have at least two carbon atoms and at least one alkene (or alkenyl) group, such as, but not limited to, ethenyl, linear or branched propenyl, linear or branched butenyl, linear or branched pentenyl, linear or branched hexencyl, etc.

Examples of aliphatic groups include, but are not limited to, alkynyl groups. As used herein, the term "alkynyl" and related terms, such as "alkynyl group(s)", means groups which include at least two carbon atoms, such as 2 to 20 carbon atoms, such as $C_2$-$C_{20}$ alkynyl groups, or $C_2$-$C_{10}$ alkynyl groups, or $C_2$-$C_6$ alkynyl groups; are linear or branched; and include one or more interior and/or terminal alkyne (or alkynyl) groups. Examples of alkynyl groups include, but are not limited to, those examples of linear or branched alkyl groups recited previously herein, which have at least two carbon atoms and at least one alkyne (or alkynyl) group, such as, but not limited to, ethynyl, propynyl, linear or branched butynyl, linear or branched pentynyl, linear or branched hexynyl, etc.

As used herein, the term "haloaliphatic" and related terms, such as "haloaliphatic group(s)", means non-cyclic and non-aromatic hydrocarbon groups, which include at least one carbon atom, such as 1 to 20 carbon atoms, such as $C_1$-$C_{20}$ haloaliphatic groups, or $C_1$-$C_{10}$ haloaliphatic groups, or $C_1$-$C_6$ haloaliphatic groups; include at least one halo group selected from fluoro (F), chloro (Cl), bromo (Br), and/or iodo (I); are linear or branched; optionally include one or more interior and/or terminal alkene groups; and optionally include one or more interior and/or terminal alkyne groups. When including two or more alkene groups, the alkene groups of an haloaliphatic group can be conjugated and/or non-conjugated. When including two or more alkyne groups, the alkyne groups of an haloaliphatic group can be conjugated and/or non-conjugated. When including at least one alkene group and at least one alkyne group, the alkene and alkyne groups of the haloaliphatic group can be conjugated and/or non-conjugated relative to each other. At least one available hydrogen of, and up to all available hydrogens of, a haloaliphatic group can be replaced with a halo group, such as selected from fluoro (F), chloro (Cl), bromo (Br), and/or iodo (I). Correspondingly, as used herein, the term "haloaliphatic" includes, but is not limited to, "perhaloaliphatic" and related terms, such as "perhaloaliphatic group(s)".

Examples of haloaliphatic groups include, but are not limited to, haloalkyl groups. As used herein, the term "haloalkyl" and related terms, such as "haloalkyl group(s)", means groups which include at least one carbon atom, such as 1 to 20 carbon atoms, such as $C_1$-$C_{20}$ haloalkyl, or $C_1$-$C_{10}$ haloalkyl, or $C_1$-$C_6$ haloalkyl; are linear or branched; include at least one halo group, such as selected from fluoro (F), chloro (Cl), bromo (Br), and/or iodo (I); and are saturated (and correspondingly are free of alkene groups and alkyne groups). At least one available hydrogen of, and up to all available hydrogens of, a haloalkyl group can be replaced with a halo group, such as selected from fluoro (F), chloro (Cl), bromo (Br), and/or iodo (I). Correspondingly, as used herein, the term "haloalkyl" includes, but is not limited to, "perhaloalkyl" and related terms, such as "perhaloalkyl group(s)". Examples of haloalkyl groups include, but are not limited to, those examples of linear or branched alkyl groups recited above, which include at least one halo group, such as, but not limited to, halomethyl, haloethyl, linear or branched halopropyl, linear or branched halobutyl, linear or branched halopentyl, linear or branched halohexyl, etc., each independently including at least one halo group.

Examples of haloaliphatic groups include, but are not limited to, haloalkenyl groups. As used herein, the term "haloalkenyl" and related terms, such as "haloalkenyl group(s)", means groups which include at least two carbon atoms, such as 2 to 20 carbon atoms, such as $C_2$-$C_{20}$ haloalkenyl, or $C_2$-$C_{10}$ haloalkenyl, or $C_2$-$C_6$ haloalkenyl; are linear or branched; include at least one halo group, such as selected from fluoro (F), chloro (Cl), bromo (Br), and/or iodo (I); and include one or more interior and/or terminal alkene (or alkenyl) groups. Examples of haloalkenyl groups include, but are not limited to, those examples of linear or branched alkyl groups recited above, which have at least two carbon atoms, at least one alkene (or alkenyl) group, and at least one halo group, such as, but not limited to, haloethenyl, linear or branched halopropenyl, linear or branched halobutenyl, linear or branched halopentenyl, linear or branched halohexenyl, etc., each independently including at least one halo group.

Examples of haloaliphatic groups include, but are not limited to, haloalkynyl groups. As used herein, the term "haloalkynyl" and related terms, such as "haloalkynyl group(s)", means groups which include at least two carbon atoms, such as 2 to 20 carbon atoms, such as $C_2$-$C_{20}$ haloalkynyl, or $C_2$-$C_{10}$ haloalkynyl, or $C_2$-$C_6$ haloalkynyl; are linear or branched; include at least one halo group (or halogen group), such as selected from fluoro (F), chloro (Cl), bromo (Br), and/or iodo (I); and include one or more interior and/or terminal alkyne (or alkynyl) groups. Examples of haloalkynyl groups include, but are not limited to, those examples of linear or branched alkyl groups recited above, which have at least two carbon atoms, at least one alkyne (or alkynyl) group, and at least one halo group, such as, but not limited to, haloethynyl, halopropynyl, linear or branched halobutynyl, linear or branched halopentynyl, linear or branched halohexynyl, etc., each independently including at least one halo group.

As used herein, the term "cycloaliphatic" and related terms, such as "cycloaliphatic group(s)", means cyclic and non-aromatic hydrocarbon groups, which include at least three carbon atoms, such as 3 to 20 carbon atoms, such as $C_3$-$C_{20}$ cycloaliphatic groups, or $C_3$-$C_{10}$ cycloaliphatic groups, or $C_3$-$C_8$ cycloaliphatic groups; optionally include at least one unsaturated group selected from alkene and/or alkyne; and optionally include two or more fused cycloaliphatic rings.

Examples of cycloaliphatic groups include, but are not limited to, cycloalkyl groups. As used herein, the term "cycloalkyl" and related terms, such as "cycloalkyl group(s)", means groups which include at least three carbon atoms, such as 3 to 20 carbon atoms, such as $C_3$-$C_{20}$ cycloalkyl groups, or $C_3$-$C_{10}$ cycloalkyl groups, or $C_3$-$C_8$ cycloalkyl groups; optionally include at least one unsaturated group selected from alkene and/or alkyne; and optionally include two or more fused cycloalkyl rings. Examples of cycloalkyl groups include, but are not limited to, cyclopropyl; cyclobutyl; cyclopentyl; cyclohexyl; cycloheptyl; cyclooctyl; cyclononyl; cyclodecyl; cycloundecyl; cyclododecyl; bicyclo[2.2.1]heptanyl; decahydronaphthalenyl; tetradecahydroanthracenyl; tetradecahydrophenanthrenyl; and dodecahydro-1H-phenalenyl.

As used herein, the term "heterocycloaliphatic" and related terms, such as "heterocycloaliphatic group(s)", means cyclic and non-aromatic groups, which include at least two carbon atoms, such as 2 to 20 carbon atoms, such as $C_2$-$C_{20}$ heterocycloaliphatic groups, or $C_2$-$C_{10}$ heterocycloaliphatic groups, or $C_2$-$C_8$ heterocycloaliphatic groups; and which have at least one hetero atom in the cyclic ring, such as, but not limited to, O, S, N, P, and combinations thereof; optionally include at least one unsaturated group selected from alkene and/or alkyne; and optionally include two or more fused non-aromatic cyclic rings, at least one of which is a fused heterocycloaliphatic ring.

Examples of heterocycloaliphatic groups include, but are not limited to, heterocycloalkyl groups. As used herein, the term "heterocycloalkyl" and related terms, such as "heterocycloalkyl group(s)", means groups which include at least two carbon atoms, such as 2 to carbon atoms, such as $C_2$-$C_{20}$ heterocycloalkyl groups, or $C_2$-$C_{10}$ heterocycloalkyl groups, or $C_2$-$C_8$ heterocycloalkyl groups; and which have at least one hetero atom in the cyclic ring, such as, but not limited to, O, S, N, P, and combinations thereof; optionally include at least one unsaturated group selected from alkene and/or alkyne; and optionally include two or more fused non-aromatic cyclic rings, at least one of which is a fused heterocycloalkyl ring. Examples of heterocycloalkyl groups include, but are not limited to, imidazolyl, tetrahydrofuranyl, tetrahydropyranyl, piperidinyl, piperazinyl, morpholinyl, 7-oxabicyclo[2.2.1]heptanyl, octahydrocyclopenta[b]pyranyl, and octahydro-1H-isochromenyl.

As used herein, the term "aryl" and related terms, such as "aryl group(s)", means cyclic aromatic hydrocarbon groups, which include at least 5 carbon atoms, such as $C_5$-$C_{20}$ aryl groups, or $C_5$-$C_{14}$ aryl groups; and optionally include at least two fused aromatic rings. Examples of aryl groups include, but are not limited to, phenyl, naphthalenyl, anthracenyl, phenanthrenyl, triphenylenyl, 9,10-dihydroanthracenyl, 9,10-dihydrophenanthrenyl, and triptycenyl.

As used herein, the term "heteroaryl" and related terms, such as "heteroaryl group(s)", means cyclic aromatic hydrocarbon groups, which include at least 3 carbon atoms, such as $C_3$-$C_{20}$ heteroaryl groups, or $C_5$-$C_{14}$ heteroaryl groups; at least one heteroatom in the aromatic ring, such as —O—, —N—, and/or —S—; and optionally include at least two fused aromatic rings, at least one of which is a fused heteroaryl ring. Examples of hetroaryl groups include, but are not limited to, pyrazolyl, imidazolyl, triazinyl, furanyl, thiophenyl, pyranyl, pyridinyl, isoquinolinyl, and pyrimidinyl.

As used herein, the term "alkoxy" and related terms, such as "alkoxy group(s)", means an alkyl group which includes at least one carbon atom, such as 1 to 20 carbon atoms, such as $C_1$-$C_{20}$ alkoxy, or $C_1$-$C_{10}$ alkoxy, or $C_1$-$C_6$ alkoxy. Examples of alkoxy groups include, but are not limited to, those examples of alkyl groups recited previously herein, which include a terminal divalent oxygen linkage or group (or terminal ether linkage or group), such as, but not limited to, methoxy ($CH_3$—O—), ethoxy ($CH_3CH_2$—O—), n-propoxy ($CH_3CH_2CH_2$—O—), iso-propoxy, linear or branched butoxy, linear or branched pentoxy, linear or branched hexoxy, etc.

As used herein, the term "amino" and related terms, such as "amino group", includes groups represented by —N($R^{11}$)($R^{12}$), where $R^{11}$ and $R^{12}$ are each independently selected, for example, from hydrogen, aliphatic groups, cycloaliphatic groups, heterocycloaliphatic groups, aryl groups, and heteroaryl groups.

As used herein, the term "halogen" and related terms, such as "halogen group(s)" and/or "halo group(s)", means a single bonded halogen atom, such as selected from fluoro (F), chloro (Cl), bromo (Br), and/or iodo (I).

As used herein, and unless otherwise explicitly stated, the term "hydrogen" and related terms, such as "hydrogen group(s)", means a single bonded hydrogen (—H).

With reference to Formula (II), and with some embodiments, R is selected from hydrogen, alkyl, and alkoxy. With further reference to Formula (II), and in accordance with some further embodiments, R is selected from hydrogen and alkyl. The alkyl and alkoxy groups from which R of Formula (II) can be selected include, but are not limited to, those classes and examples of alkyl and alkoxy groups described previously herein. With some embodiments, R of Formula (II) is selected from hydrogen, methyl, ethyl, n-propyl, i-propyl, linear or branched butyl, linear or branched pentyl, linear or branched hexyl, methoxy, ethoxy, n-propoxy, i-propoxy, linear or branched butoxy, linear or branched pentoxy, and linear or branched hexoxy.

With some embodiments, e' and f' for each occurrence for Formula (II) are independently from 0 to 4 (such as 0, 1, 2, 3, or 4, and combinations thereof); provided the sum of e' and f' is at least 2, such as from 2 to 8, or 2 to 5, or 2 to 4.

With reference to Formula (III), and in accordance with some embodiments, P is selected from R, as described with regard to Formula (II); acrylate ($CH_2$=CHC(O)O—), methacrylate ($CH_2$=C($CH_3$)C(O)O—); trihalomethacrylate ($CH_2$=C($CX_3$)C(O)O— where each X independently is a halogen or halo group); oxirane

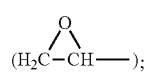

hydroxyl (—OH); amino; carboxylic acid (—C(O)OH); and carboxylic acid ester (—C(O)OR', where R' is selected from aliphatic group, cycloaliphatic group, aryl, and heteroaryl).

Examples of trihalomethacrylate from which P can be selected include, but are not limited to, trifluoromethacrylate and trichloromethacrylate.

In accordance with some embodiments, and with reference to Formula (III), subscript d is 0 to 20, or 0 to 15, or 0 to 12, or 0 to 10, or 0 to 8, or 0 to 5.

With further reference to Formula (III), $S_1$ independently for each d is selected from an $S_1$-spacer unit chosen from —(CH$_2$)—; —O—; —C(O)—; and —NH—, provided that when two $S_1$-spacer units including heteroatoms are linked together, the $S_1$-spacer units are linked so that heteroatoms are not directly linked to each other. Adjacent $S_1$-spacer units can together form various divalent linkages, such as, but not limited to, alkyl linkages; ether linkages; ester (or carboxylate) linkages, —O—C(O)— and/or —C(O)—O—; carbonate linkages, —O—C(O)—O—; amide linkages, —NH—C(O)— and/or —C(O)—NH—; urea linkages, —NH—C(O)—NH—; carbamate linkages, —O—C(O)—NH— and/or —NH—C(O)—O—; dione linkages, —C(O)—C(O)—; and combinations thereof, provided that the $S_1$-spacer units are linked so that heteroatoms are not directly linked to each other. With some embodiments, $S_1$-spacer units being linked so that heteroatoms are not directly linked to each other, means that —(S$_1$)$_d$— is free of: —O— bonded directly to —O—; —NH— bonded directly to —NH—; and —O— and —NH— bonded directly to each other.

With some embodiments, e" and f" for each occurrence for Formula (III), are independently from 0 to 6 (such as 0, 1, 2, 3, 4, 5, or 6, and combinations thereof), provided the sum of e" and f" is at least 2, such as from 2 to 10, or 2 to 5, or 2 to 4.

Independently for each of Formula (II) and Formula (III), and in accordance with some embodiments, $S_2$, $S_3$, and $S_4$ for each occurrence are independently selected from a spacer unit chosen from —(CH$_2$)—, —O—, —C(O)—, and —NH—; subscripts e, f, and g for each occurrence are independently 0 to 3 (such as 0, 1, 2, or 3); provided that when two spacer units including heteroatoms are linked together the spacer units are linked so that heteroatoms are not directly linked to each other. Adjacent spacer units from which each of $S_2$, $S_3$, and $S_4$ are each independently selected can together form various linkages (such as, but not limited to, divalent linkages), such as, but not limited to, alkyl linkages; ether linkages; ester (or carboxylate) linkages, —O—C(O)— and/or —C(O)—O—; carbonate linkages, —O—C(O)—O—; amide linkages, —NH—C(O)— and/or —C(O)—NH—; urea linkages, —NH—C(O)—NH—; carbamate linkages, —O—C(O)—NH— and/or —NH—C(O)—O—; dione linkages, —C(O)—C(O)—; and combinations thereof, provided that the spacer units are linked so that heteroatoms are not directly linked to each other. With some embodiments, spacer units (from which each of $S_2$, $S_3$, and $S_4$ are each independently selected) being linked so that heteroatoms are not directly linked to each other, means that such combinations of adjacent spacer units are free of —O— bonded directly to —O—; —NH— bonded directly to —NH—; and —O— and —NH— bonded directly to each other.

With reference to Formula (III) and in accordance with some embodiments of the present invention, $Q_1$ is a divalent group selected from unsubstituted or substituted cycloalkyl; unsubstituted or substituted phenyl; unsubstituted or substituted naphthyl; and unsubstituted or substituted triptycenyl; in which the cycloalkyl substituents, phenyl substituents, naphthyl substituents, and triptycenyl substituents, are each independently selected from alkyl and halogen, where the alkyl groups and halogen groups are each selected from those classes and examples as described previously herein. With further embodiments, and independently for each of Formula (II) and Formula (III), $Q_2$ and $Q_3$ for each occurrence are independently a divalent group selected from unsubstituted or substituted cycloalkyl; unsubstituted or substituted phenyl; unsubstituted or substituted naphthyl; and unsubstituted or substituted triptycenyl; in which the cycloalkyl substituents, phenyl substituents, naphthyl substituents, and triptycenyl substituents, are each independently selected from alkyl and halogen, where the alkyl groups and halogen groups are each selected from those classes and examples as described previously herein.

With reference to Formula (III) and in accordance with some additional embodiments of the present invention, $Q_1$ is a divalent group selected from unsubstituted or substituted 1,4-cyclohexyl; unsubstituted or substituted 1,4-phenyl; unsubstituted or substituted 1,5-naphthyl; unsubstituted or substituted 2,6-naphthyl; unsubstituted or substituted 1,8-naphthyl; and unsubstituted or substituted 1,4-triptycenyl, in which the 1,4-cyclohexyl substituents, 1,4-phenyl substituents, 1,5-naphthyl substituents, 2,6-naphthyl substituents, 1,8-naphthyl substituents, and 1,4-triptycenyl substituents, are each independently selected from alkyl and halogen, where the alkyl groups and halogen groups are each selected from those classes and examples as described previously herein. With some further embodiments, and independently for each of Formula (II) and Formula (III), $Q_2$ and $Q_3$ for each occurrence are independently a divalent group selected from the group consisting of unsubstituted or substituted 1,4-cyclohexyl; unsubstituted or substituted 1,4-phenyl; unsubstituted or substituted 1,5-naphthyl; unsubstituted or substituted 2,6-naphthyl; unsubstituted or substituted 1,8-naphthyl; and unsubstituted or substituted 1,4-triptycenyl, wherein the 1,4-cycloalkyl substituents, 1,4-phenyl substituents, 1,5-naphthyl substituents, 2,6-naphthyl substituents, 1,8-naphthyl substituents, and 1,4-triptycenyl substituents, are each independently selected from alkyl and halogen, where the alkyl groups and halogen groups are each selected from those classes and examples as described previously herein.

With some embodiments of the mesogen-containing compounds of the present invention, and with reference to Formula (I), Mesogen-2 is represented by Formula (II) of Mesogen-1.

With some further embodiments of the mesogen-containing compounds of the present invention, and with reference to Formula (I), Mesogen-2 is represented by Formula (II) of Mesogen-1, and Mesogen-1 and Mesogen-2 are the same.

With reference to Formula (I), and with some embodiments, -L- is represented by Formula (IV) provided previously herein in which y is from 1 to 30, or 2 to 20; and in which each A independently for each y is a divalent group selected from an aliphatic group and a haloaliphatic group. With some further embodiments, and with reference to Formula (I), -L- is represented by Formula (IV) provided previously herein, in which each A independently for each y is a divalent group selected from alkyl groups and haloalkyl groups, in which the alkyl groups and haloalkyl groups are each selected from those classes and examples of alkyl groups and haloalkyl groups described previously herein.

With further reference to Formula (IV), and in accordance with some further embodiments, B independently for each y is a divalent group selected from —O—; —C(O)O—; —OC(O)O—; —C(O)N(R$_1$)— where R$_1$ is H or alkyl; —NH—C(O)O—; —N(R$_2$)C(O)N(R$_2$)— where each R$_2$ is independently selected from H or alkyl;

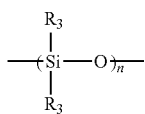

where n is 1 to 5, and each $R_3$ independently for each n is selected from methyl, ethyl, and phenyl; —Si($R_4$)($R_4$)— where each $R_4$ is independently selected from methyl, ethyl, and phenyl; unsubstituted or substituted cycloalkyl (such as, but not limited to, cyclohexyl); unsubstituted or substituted phenyl; and unsubstituted or substituted —O—(Phenyl)-O—; in which the cycloalkyl substituents, the phenyl substituents, and —O—(Phenyl)-O— substituents are each independently selected from alkyl, and —($S_1$)$_d$—P, where $S_1$, d and P are each as described with regard to Formula (III). The alkyl groups from which each of $R_2$, $R_3$, and $R_4$, and the various substituents can be independently selected include, but are not limited to, those classes and examples of alkyl groups described previously herein.

With further reference to Formula (IV), E is a divalent group selected from the group consisting of aliphatic groups and haloaliphatic groups. With additional reference to Formula (IV), and with some embodiments, E is a divalent group selected from alkyl groups and haloalkyl groups, in which the alkyl groups and haloalkyl groups are each selected from those classes and examples of alkyl groups and haloalkyl groups described previously herein.

With some embodiments, and with reference to Formula (IV), no B is a divalent group selected from, unsubstituted or substituted cycloaliphatic groups, unsubstituted or substituted aryl, and unsubstituted or substituted —O-(Aryl)-O—; or only one B is a divalent group selected from, unsubstituted or substituted cycloaliphatic groups, unsubstituted or substituted aryl, and unsubstituted or substituted —O-(Aryl)-O—.

With some further embodiments, and with further reference to Formula (IV), no B is a divalent group selected from, unsubstituted or substituted cycloalkyl (such as, but not limited to, unsubstituted or substituted cyclohexyl), unsubstituted or substituted phenyl, unsubstituted or substituted naphthyl, and unsubstituted or substituted —O—(Phenyl)-O—; or only one B is a divalent group selected from, unsubstituted or substituted cycloalkyl (such as, but not limited to, unsubstituted or substituted cyclohexyl), unsubstituted or substituted phenyl, unsubstituted or substituted naphthyl, and unsubstituted or substituted —O—(Phenyl)-O—.

As used herein, recitations of "—O-(Aryl)-O—" means an aryl group that includes two —O— linking groups, and which can be represented by the following Formula (V),

(V)

With reference to Formula (V), and correspondingly —O-(Aryl)-O—, the aryl group (or portion, or ring) can be selected from those classes and examples of aryl groups as described previously herein.

As used herein, recitations of —O—(Phenyl)-O— means a phenyl group that includes two —O— linking groups, and which can be represented by the following Formula (VI),

(VI)

With reference to Formula (I), and in accordance with some embodiments, -L- includes at least 20 bonds, such as 20 to 200 bonds (or 30 to 200 bonds), or 20 to 150 bonds (or 30 to 150 bonds), or 30 to 140 bonds (or 40 to 140 bonds), or 30 to 130 bonds (or 40 to 130 bonds), or 40 to 120 bonds (or 50 to 120 bonds), or 50 to 110 bonds, where each bond is independently selected from a single bond, a double bond, and a triple bond.

With some embodiments, the linking group -L-, that links Mesogen-1 and Mesogen-2 together, is itself free of mesogen properties (the linking group -L- is non-mesogenic).

In accordance with some embodiments, -L- of Formula (I) is selected from the following Formulas L(1) through L(23), including combinations of two or more thereof:

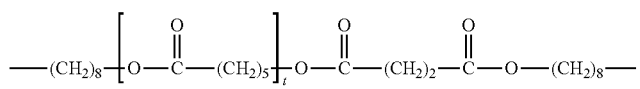

L(1)

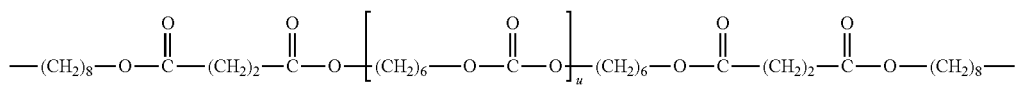

L(2)

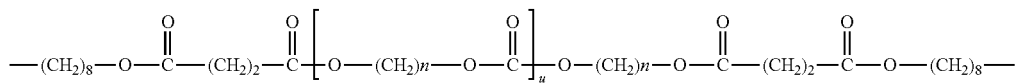

L(3)

n = 5 and 6, 1:1

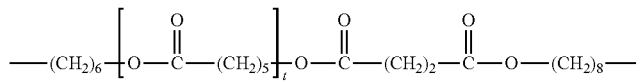

L(4)

-continued
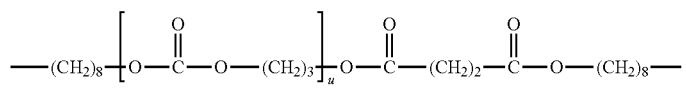
L(5)
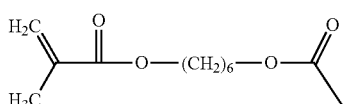
L(6)
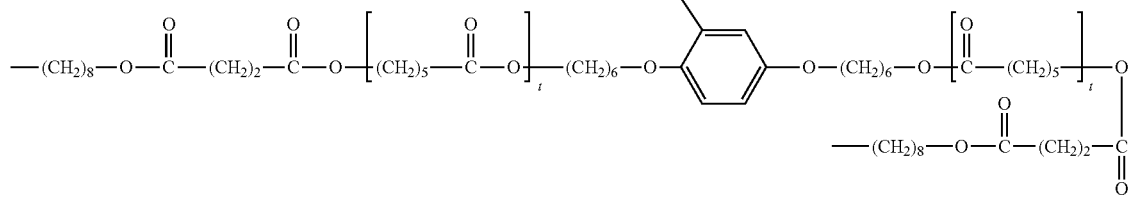
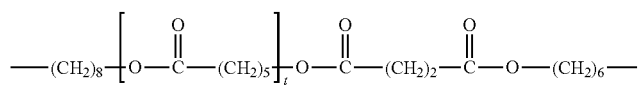
L(7)
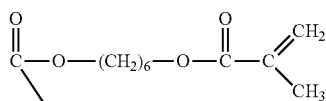
L(8)
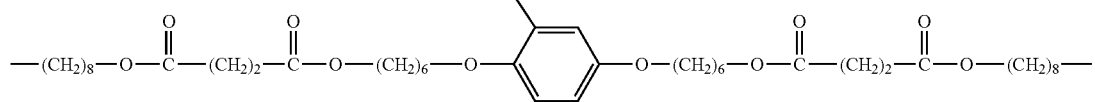
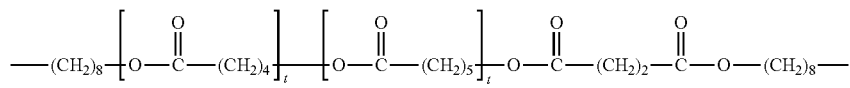
L(9)
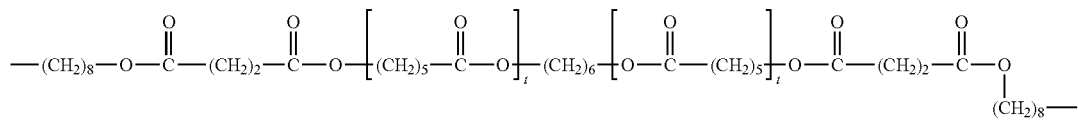
L(10)
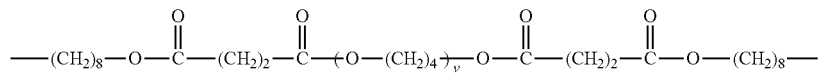
L(11)
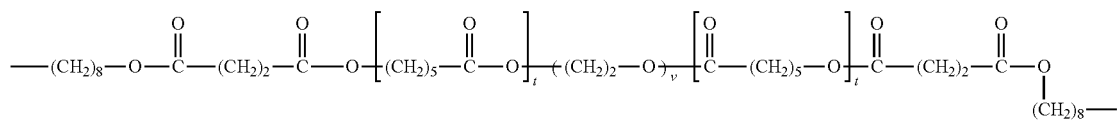
L(12)
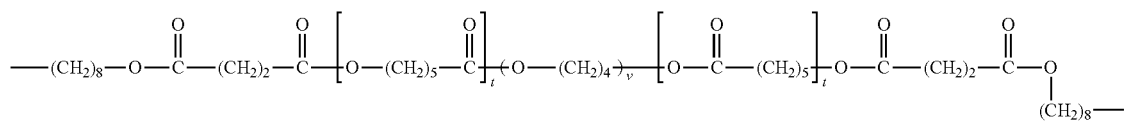
L(13)
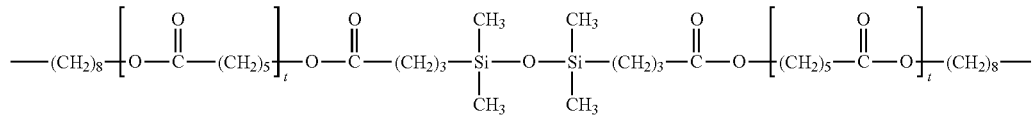
L(14)
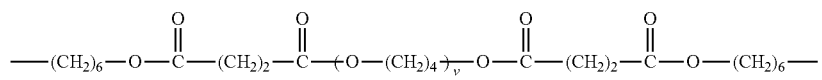
L(15)

-continued
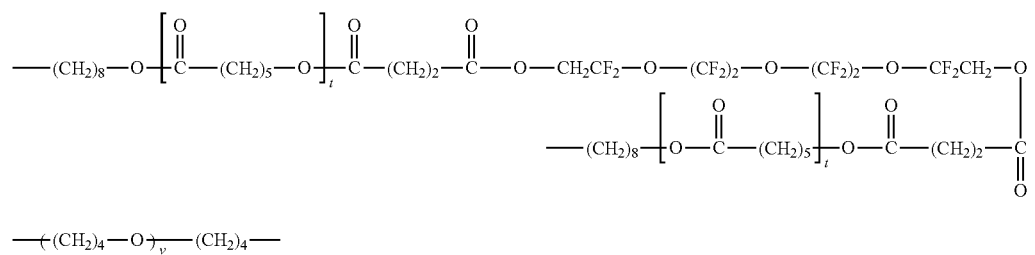
L(16)
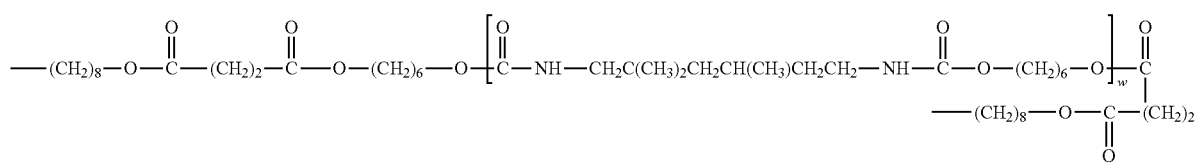
L(17)
—((CH₂)₄—O)$_v$—(CH₂)₄—
L(18)
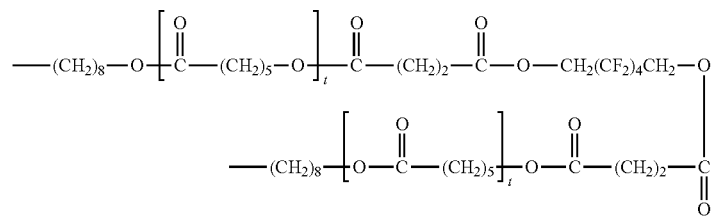
L(19)
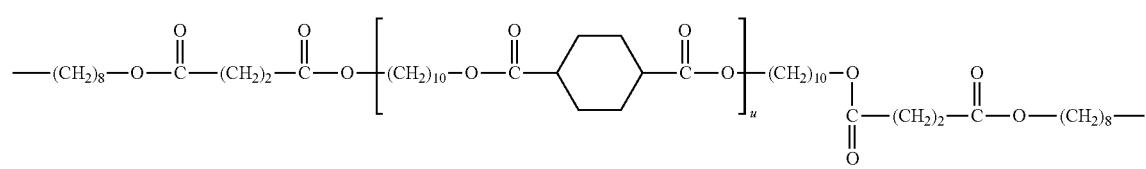
L(20)
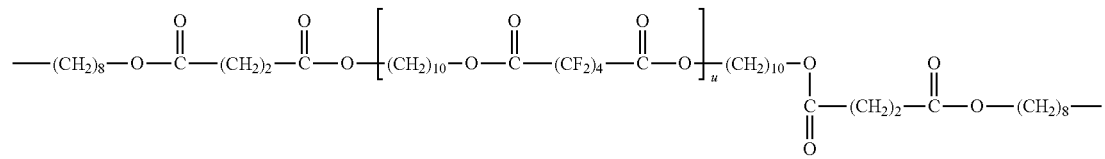
L(21)
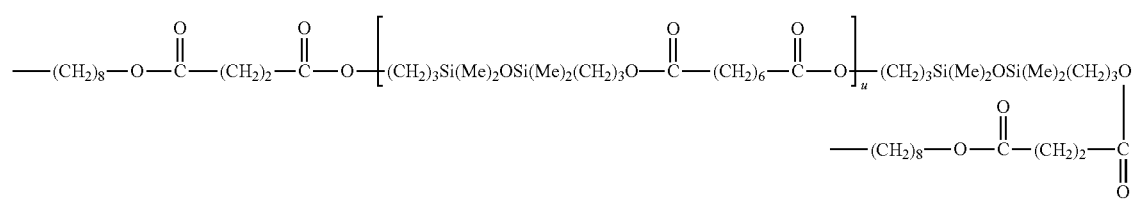
(L22)
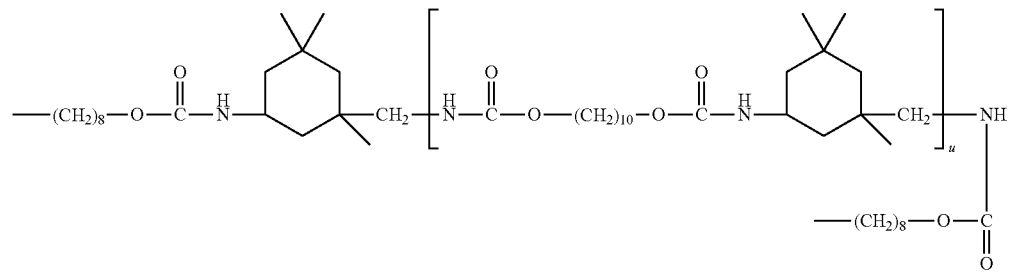
L(23)

With reference to Formulas L(1) through L(23), each t, each u, each v, and each w, for each occurrence, are each independently from 1 to 20.

The present invention relates to a liquid crystal composition that includes the mesogen-containing compound(s) of the present invention, such as described with reference to Formula (I). Liquid crystal compositions according to the present invention, in some embodiments, in addition to at least one compound represented by Formula I, can further include at least one of a photochromic compound, a dichroic compound, and/or a photochromic-dichroic compound.

Classes of photochromic compounds that can be present in the liquid crystal compositions of the present invention include, but are not limited to, indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, non-thermally reversible photochromic compounds, and mixtures thereof.

Photochromic-dichroic compounds that can be present in the liquid crystal compositions of the present invention typically include at least one photochromic moiety; and at least one covalently bonded lengthening group, which can include at least one mesogenic segment. With some embodiments, each photochromic moiety of the photochromic-dichroic compound is selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, non-thermally reversible photochromic compounds, and combinations thereof.

Classes and examples of lengthening groups of the photochromic-dichroic compounds that can be included in the liquid crystal compositions of the present invention include, but are not limited to, those described at columns 37-51 of U.S. Pat. No. 9,334,439 B2, which disclosure is incorporated herein by reference.

Liquid crystal compositions according to the present invention can optionally further include at least one additive. Examples of such optional additives include, but are not limited to, liquid crystal materials, liquid crystal property control additives, non-linear optical materials, dyes (e.g., static dyes), dichroic dyes, blue light blocking (or filtering) agents, alignment promoters, kinetic enhancers, photoinitiators, thermal initiators, surfactants, polymerization inhibitors, solvents, light stabilizers, thermal stabilizers, mold release agents, rheology control agents, gelators, leveling agents, free radical scavengers, coupling agents, tilt control additives, block or non-block polymeric materials, and/or adhesion promoters. Classes and examples of blue light blocking (or filtering) agents include, but are not limited to, those described in U.S. Pat. No. 9,683,102 B2 and US 2015/0234208 A1, the pertinent portions of which are incorporated herein by reference.

Classes of solvents that can be included in the liquid crystal compositions of the present invention include, with some embodiments, water, organic solvents, and combinations thereof.

Classes of organic solvents that can be present in the liquid crystal compositions of the present invention include, but are not limited to, alcohols, such as methanol, ethanol, n-propanol, iso-propanol, n-butanol, sec-butyl alcohol, tert-butyl alcohol, iso-butyl alcohol, benzyl alcohol, furfuryl alcohol, and tetrahydrofurfuryl alcohol; ketones or ketoalcohols, such as acetone, methyl ethyl ketone, and diacetone alcohol; ethers, such as dimethyl ether and methyl ethyl ether; cyclic ethers, such as tetrahydrofuran, and dioxane; esters, such as ethyl acetate, 2-butoxyethylacetate, ethyl lactate, ethylene carbonate, and propylene carbonate, in particular 1,2-propanediol cyclic carbonate; hydroxy functional ethers of alkylene glycols, such as butyl 2-hydroxyethyl ether, methyl 2-hydroxypropyl ether, and phenyl 2-hydroxypropyl ether; nitrogen containing cyclic compounds, such as pyrrolidone, N-methyl-2-pyrrolidone, 1-butylpyrrolidin-2-one, and 1,3-dimethyl-2-imidazolidinone; sulfur containing compounds, such as dimethyl sulfoxide and tetramethylene sulfone; aromatic compounds, such as toluene, xylene, anisole, and butyl benzoate; and mixtures of aromatic compounds, such as, but not limited to, Aromatic 100 Fluid, which is a commercially available mixture of $C_9$-$C_{10}$ dialkyl- and trialkyl-benzenes, or Aromatic 150 Fluid, which is a commercially available mixture of $C_9$-$C_{11}$ alkyl benzenes.

Examples of dichroic dyes that can be included in the liquid crystal compositions of the present invention include, but are not limited to, azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine, iodates, or combinations of two or more thereof.

In accordance with the present invention, there is further provided an optical element that includes a substrate; and a layer on (or over) at least a portion of a surface of the substrate, in which the layer includes at least one mesogen-containing compound according to the present invention.

The substrate of the optical element, with some embodiments, is an optical substrate, which can include organic materials (such as organic polymers), inorganic materials, or combinations thereof (for example, composite materials). Examples of substrates that can be included in the optical elements of the present invention include, but are not limited to, those described at column 35, line 5 through column 36, line 57 of U.S. Pat. No. 8,628,685 B2, which disclosure is incorporated herein by reference.

The layer(s) provided over the substrate of the optical elements of the present invention include, with some embodiments, an organic matrix, such as an organic polymer matrix, which can be a cured (or crosslinked) organic matrix, or a thermoplastic organic matrix. Correspondingly, each layer of the optical elements of the present invention can be selected from cured (or crosslinked) layers and thermoplastic layers. The organic matrix of each layer of the optical elements of the present invention can include linkages such as, but not limited to, ether linkages; carboxylic acid ester linkages; urethane linkages; amide linkages; urea linkages; carbonate linkages; linkages formed from the radical polymerization of radically polymerizable ethylenically unsaturated groups, such as, but not limited to, vinyl groups, allyl groups, and/or (meth)acrylate groups; and combinations of two or more thereof.

Each layer of the optical elements of the present invention can be formed by art-recognized methods, such as, but not limited to, lamination methods and coating methods. Coating methods include, but are not limited to, spray coating methods; spin coating methods; curtain coating methods; dip coating methods; micro-jet coating methods (such as ink-jet coating methods); in-mold coating methods; and combinations thereof. Lamination methods include, but are not limited to, extrusion lamination methods (such as directly over the substrate); in-mold lamination methods (in which a laminate is placed in a mold, and the substrate is formed there-against within the mold); thermal lamination methods (in which a laminate is thermally fused over the substrate); adhesive lamination methods (in which the laminate is adhered over the substrate by an interposed adhesive layer); and combinations thereof.

With some embodiments of the present invention, the optical element further includes an alignment layer interposed between the substrate and the layer (which includes a mesogen-containing compound of the present invention), in which the alignment layer is at least partially alignable by exposure to at least one of a magnetic field, an electric field, linearly polarized radiation, shear force, or combinations of two or more thereof. Classes and examples of materials that can be used as or to form the alignment layer include, but are not limited to, the orientation facilities, orientation materials, alignment media, and alignment facilities described at: column 5, line 5 through column 6, line 4; column 7, line 56 through column 24, line 36; and the examples of U.S. Pat. No. 8,926,091 B2, which disclosure is incorporated herein by reference.

The optical element of the present invention can, with some embodiments, include one or more additional layers, such as, but not limited to, primer layer(s), antireflective layer(s), protective layer(s), and hardcoat layer(s), polarizing layer(s). Classes and examples of such additional optional layers are described at column 20, line 30 through column 21, line 38 of U.S. Pat. No. 8,828,284 B2, which disclosure is incorporated herein by reference.

With some embodiments, the optical element of the present invention is selected from an ophthalmic element, a display element, a window, a mirror, and a liquid crystal cell element.

With some further embodiments, the ophthalmic element of the present invention is selected from a corrective lens, a non-corrective lens, a contact lens, an intra-ocular lens, a magnifying lens, a protective lens, and a visor.

The present invention can be further characterized by one or more of the following non-limiting clauses 1-16.

Clause 1: A mesogen-containing compound represented by the following Formula (I),

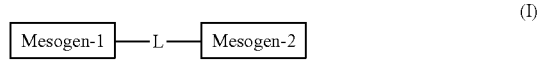
(I)

wherein:
(A) Mesogen-1 is represented by the following Formula (II),

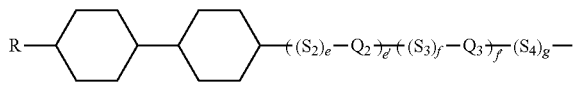
(II)

wherein:
R is selected from hydrogen, alkyl, and alkoxy; and
e' and f' for each occurrence for Formula (II), are independently from 0 to 4, provided the sum of e' and f' is at least 2;
(B) Mesogen-2 is represented by Formula (II) of Mesogen-1, or the following Formula (III),

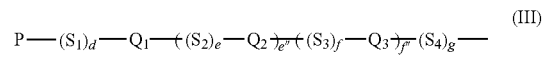
(III)

wherein:
P is selected from R, acrylate, methacrylate, trihalomethacrylate, oxirane, hydroxyl, amino, carboxylic acid, and carboxylic acid ester;
d is 0 to 20;
$S_1$ independently for each d is selected from an $S_1$-spacer unit chosen from —$(CH_2)$—; —O—; —C(O)—; and —NH—, provided that when two $S_1$-spacer units comprising heteroatoms are linked together, the $S_1$-spacer units are linked so that heteroatoms are not directly linked to each other;
$Q_1$ is a divalent group selected from the group consisting of unsubstituted or substituted cycloaliphatic group; unsubstituted or substituted heterocycloaliphatic group; unsubstituted or substituted aryl; and unsubstituted or substituted heteroaryl; wherein the cycloaliphatic group substituents, heterocycloaliphatic group substituents, aryl substituents, and heteroaryl substituents are each independently selected from alkyl and halogen; and
e" and f" for each occurrence for Formula (III) are independently from 0 to 6, provided the sum of e" and f" is at least 2;
wherein independently for each of Formula (II) and Formula (III),
(i) $Q_2$ and $Q_3$ for each occurrence are independently a divalent group selected from the group consisting of unsubstituted or substituted cycloaliphatic group; unsubstituted or substituted heterocycloaliphatic group; unsubstituted or substituted aryl; and unsubstituted or substituted heteroaryl; wherein the cycloaliphatic group substituents, heterocycloaliphatic group substituents, aryl substituents, and heteroaryl substituents are each independently selected from alkyl and halogen;
(ii) $S_2$, $S_3$, and $S_4$ for each occurrence are independently selected from a spacer unit chosen from —$(CH_2)$—; —O—; —C(O)—; and —NH—; and
(iii) e, f, and g for each occurrence are independently 0 to 3, provided that when two spacer units comprising heteroatoms are linked together the spacer units are linked so that heteroatoms are not directly linked to each other;
(C) -L- is represented by the following Formula (IV),

wherein:
(i) y is 1 to 30;
(ii) each A independently for each y is a divalent group selected from the group consisting of aliphatic group and haloaliphatic group;
(iii) each B independently for each y is a divalent group selected from the group consisting of —O—; —C(O)O—; —OC(O)O—; —C(O)N($R_1$)— where R₁ is H or alkyl; —NH—C(O)O—; —N(R₂)C(O)N(R₂)— where each R₂ is independently selected from H or alkyl;

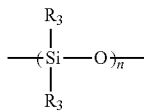

where n is 1 to 5, and each R₃ independently for each n is selected from methyl, ethyl, and phenyl; —Si(R₄)(R₄)— where each R₄ is independently selected from methyl, ethyl, and phenyl; unsubstituted or substituted cycloaliphatic groups; unsubstituted or substituted aryl; and unsubstituted or substituted —O-(Aryl)-O—; wherein the cycloaliphatic substituents, the aryl substituents, and —O-(Aryl)-O— substituents are each independently selected from alkyl, and —(S₁)_d—P, where S₁, d and P are each as defined with regard to Formula (III); and (iv) E is a divalent group selected from the group consisting of aliphatic group and haloaliphatic group.

Clause 2: The mesogen-containing compound of clause 1, wherein:

(B) for Formula (III),

Q₁ is a divalent group selected from the group consisting of unsubstituted or substituted cycloalkyl; unsubstituted or substituted phenyl; unsubstituted or substituted naphthyl; and unsubstituted or substituted triptycenyl; wherein the cycloalkyl substituents, phenyl substituents, naphthyl substituents, and triptycenyl substituents are each independently selected from alkyl and halogen; and wherein independently for each of Formula (II) and Formula (III), Q₂ and Q₃ for each occurrence are independently a divalent group selected from the group consisting of unsubstituted or substituted cycloalkyl; unsubstituted or substituted phenyl; unsubstituted or substituted naphthyl; and unsubstituted or substituted triptycenyl; wherein the cycloalkyl substituents, phenyl substituents, naphthyl substituents, and triptycenyl substituents are each independently selected from alkyl and halogen.

Clause 3: The mesogen-containing compound of clause 2, wherein:

for Formula (III), Q₁ is a divalent group selected from the group consisting of unsubstituted or substituted 1,4-cyclohexyl; unsubstituted or substituted 1,4-phenyl; unsubstituted or substituted 1,5-naphthyl; unsubstituted or substituted 2,6-naphthyl; unsubstituted or substituted 1,8-naphthyl; and unsubstituted or substituted 1,4-triptycenyl, wherein the 1,4-cyclohexyl substituents, 1,4-phenyl substituents, 1,5-naphthyl substituents, 2,6-naphthyl substituents, 1,8-naphthyl substituents, and 1,4-triptycenyl substituents are each independently selected from alkyl and halogen; and independently for each of Formula (II) and Formula (III), Q₂ and Q₃ for each occurrence are independently a divalent group selected from the group consisting of unsubstituted or substituted 1,4-cyclohexyl; unsubstituted or substituted 1,4-phenyl; unsubstituted or substituted 1,5-naphthyl; unsubstituted or substituted 2,6-naphthyl; unsubstituted or substituted 1,8-naphthyl; and unsubstituted or substituted 1,4-triptycenyl, wherein the 1,4-cycloalkyl substituents, 1,4-phenyl substituents, 1,5-naphthyl substituents, 2,6-naphthyl substituents, 1,8-naphthyl substituents, and 1,4-triptycenyl substituents are each independently selected from alkyl and halogen.

Clause 4: The mesogen-containing compound of clause 3, wherein:

(A) for Formula (II),
R is selected from hydrogen and alkyl;

(B) for Formula (III),
P is selected from R, acrylate, and methacrylate;

(C) for Formula (IV),
(ii) each A independently for each y is a divalent group selected from the group consisting of alkyl and haloalkyl;
(iii) each B independently for each y is a divalent group selected from the group consisting of —O—; —C(O)O—; —OC(O)O—; —C(O)N(R₁)— where R₁ is H or alkyl; —NH—C(O)O—; —N(R₂)C(O)N(R₂)— where each R₂ is independently selected from H or alkyl;

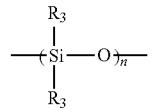

where n is 1 to 5, and each R₃ independently for each n is selected from methyl and phenyl; —Si(R₄)(R₄)— where each R₄ is independently selected from methyl and phenyl; unsubstituted or substituted cycloalkyl (such as, but not limited to, unsubstituted or substituted cyclohexyl); unsubstituted or substituted phenyl; and unsubstituted or substituted —O—(Phenyl)-O—; wherein the cycloalkyl substituents, the phenyl substituents, and —O—(Phenyl)-O— substituents are each independently selected from alkyl, and —(S₁)_dP, where S₁, d and P are each as defined with regard to Formula (III); and (iv) E is a divalent group selected from the group consisting of alkyl groups and haloalkyl groups.

Clause 5: The mesogen-containing compound of clauses 1, 2, 3, or 4, wherein provided that for Formula (IV), no B or only one B is a divalent group selected from the group consisting of unsubstituted or substituted cycloaliphatic groups; unsubstituted or substituted aryl; and unsubstituted or substituted —O-(Aryl)-O—.

Clause 6: The mesogen-containing compound of clauses 1, 2, 3, 4, or 5, wherein provided that for Formula (IV), no B or only one B is a divalent group selected from the group consisting of unsubstituted or substituted cycloalkyl groups (such as, but not limited to, unsubstituted or substituted cyclohexyl groups); unsubstituted or substituted phenyl; unsubstituted or substituted naphthyl; and unsubstituted or substituted —O—(Phenyl)-O—.

Clause 7: The mesogen-containing compound of clauses 1, 2, 3, 4, 5, or 6, wherein Mesogen-2 is represented by Formula (II) of Mesogen-1.

Clause 8: The mesogen-containing compound of any one of clauses 1-7, wherein Mesogen-2 is represented by Formula (II) of Mesogen-1, and Mesogen-1 and Mesogen-2 are the same.

Clause 9: The mesogen-containing compound of any one of clauses 1-8, wherein -L- comprises at least 20 bonds.

Clause 10: A liquid crystal composition comprising the mesogen-containing compound of any one of clauses 1-9.

Clause 11: The liquid crystal composition of clause 10, further comprising at least one of a photochromic compound, a dichroic compound, and a photochromic-dichroic compound.

Clause 12: The liquid crystal composition of clause 11, wherein the photochromic-dichroic compound comprises at least one photochromic moiety, and said photochromic compound and each photochromic moiety of said photochromic-dichroic compound are in each case independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline) naphthoxazines, spiro(indoline)pyridobenzoxazines, spiro (indoline)fluoranthenoxazines, spiro(indoline)quinoxazines, fulgides, fulgimides, diarylethenes, diarylalkylethenes, diarylalkenylethenes, non-thermally reversible photochromic compounds, and mixtures thereof.

Clause 13: An optical element comprising:
a substrate; and
a layer on at least a portion of a surface of said substrate, wherein said layer comprises the mesogen-containing compound of any one of clauses 1-9.

Clause 14: The optical element of clause 13, further comprising an alignment layer interposed between the substrate and said layer, wherein the alignment layer is at least partially alignable by exposure to at least one of a magnetic field, an electric field, linearly polarized radiation, shear force, or combinations of two or more thereof.

Clause 15: The optical element of clauses 13 or 14, wherein the optical element is selected from an ophthalmic element, a display element, a window, a mirror, and a liquid crystal cell element.

Clause 16: The ophthalmic element of claim 15, wherein the ophthalmic element is selected from a corrective lens, a non-corrective lens, a contact lens, an intra-ocular lens, a magnifying lens, a protective lens, and a visor.

The present invention is more particularly described in the following examples, which are intended as illustrative only, since numerous modifications and variations therein will be apparent to those skilled in the art.

EXAMPLES

In Part 1a of the following examples, the preparation of mesogen-containing portions or segments is described. In Part 1b there is described the preparation of two non-mesogenic diols that were used in the preparation of mesogen-containing compounds according to some embodiments of the present invention. In Part 2 there is described the preparation of mesogen-containing compounds, which include a non-mesogenic linking group (-L-) that connects (covalently bonds) together two separate mesogen-containing portions or segments. In Part 3 there is described the preparation of liquid crystal coating formulations. In Part 4 there is described the preparation of coated substrates (test specimens). In Part 5 there is described the photochromic performance testing of the test specimens.

Part 1a
Synthesis of Mesogen-Containing Segments.

Mesogen-containing segments S1 through S9 each include a single terminal R-substituted bicyclohexyl group or substructure,

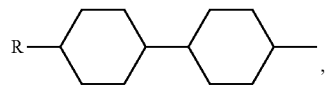

where R— is —$C_5H_{11}$ or —$C_3H_7$. Representative structures for mesogen-containing segments S1 through S9 are depicted in Table 1. Mesogen-containing segments S10 through S16 do not include a terminal R-substituted bicyclohexyl group or substructure. Representative structures for Segments S10 through S16 are depicted in Table 2.

Segment S1
4-((4-((8-Hydroxyoctyl)oxy)benzoyl)oxy)phenyl trans, trans-4'pentyl-[1,1'-bi(cyclohexane)]-4-carboxylate was prepared in accordance with Example 1, steps 1 through 8 of United States Patent Application Publication No. 2017/0275534 A1, which particular disclosure of which is incorporated herein by reference.

Segment S2
To a one-neck, round bottom flask containing Segment S1 (400 g) and succinic anhydride (74.0 g) was added toluene (1.5 L) and triethylamine ("$Et_3N$," 15.0 mL). The suspension was heated to 80° C. and stirred for 5 hours. The reaction mixture was poured into hot ethyl acetate ("EtOAc," 1.5 L, 65° C.) over 5 minutes while stirring, then the flask was rinsed with tetrahydrofuran ("THF," 100 mL). The resulting solution was allowed to cool to room temperature and crystallized overnight to yield 410 g of product (yield 88%). By $^1$H NMR analysis it was determined that the product had a structure consistent with 4-oxo-4-((8-(4-((4-((4'-pentyl-[1,1'-bi(cyclohexane)]-4-carbonyl)oxy)phenoxy) carbonyl)phenoxy)octyl)oxy)butanoic acid.

Segment S3
Step 1
The procedures of Example 1, steps 1 through 8 of United States Patent Application Publication No. 2017/0275534 A1 were followed, substituting equimolar amounts of ⅔-methyl-4-((tetrahydro-2H-pyran-2-yl)oxy)phenol in place of 4-((tetrahydro-2H-pyran-2-yl)oxy)phenol in step 2, and 4'-((6-((tetrahydro-2H-pyran-2-yl)oxy)hexyl)oxy)-[1,1'-biphenyl]-4-carboxylic acid in place of 4-(8-(tetrahydro-2H-pyran-2-yloxy)octyloxy)-benzoic acid in step 7. This yielded ⅔-methyl-4-((4'-pentyl-[1,1'-bi(cyclohexane)]-4-carbonyl)oxy)phenyl 4'-((6-hydroxyhexyl)oxy)-[1,1'-biphenyl]-4-carboxylate.

Step 2
The product of step 1 above was subjected to the same reaction conditions described for Segment S2 above to yield 4-((6-((4'-((⅔-methyl-4-((4'-pentyl-[1,1'-bi(cyclohexane)]-4-carbonyl)oxy)phenoxy)carbonyl)-[1,1'-biphenyl]-4-yl) oxy)hexyl)oxy)-4-oxobutanoic acid.

Segment S4
Step 1
Pyridine (24.1 g), 4-(4'-pentyl-[1,1'-bi(cyclohexan)]-4-yl) phenol (50.0 g), and dichloromethane ("DCM," 250 mL) were mixed and cooled to 0° C., after which trifluoromethanesulfonic anhydride (51.5 g) in DCM (250 mL) was added dropwise. The mixture was warmed to room temperature and allowed to stir for 10 hours. The resulting mixture was washed with brine and dried over $MgSO_4$. The solvent was removed and the residue was passed through a short pad of silica. The crude product was precipitated from EtOAc and methanol ("MeOH") at −10° C. Yield: 65 g.

Step 2
To a one-neck, round bottom flask containing the product of Step 1 (30.0 g), 4-carboxyphenylboronic acid (13.0 g) and Na$_2$CO$_3$ (42.0 g), was added a solution of 1,2-dimethoxyethane (200 mL) and water (200 mL). The suspension was purged with nitrogen for 10 minutes before Pd(PPh$_3$)$_4$ (3.75 g) was added, then stirred at 75° C. for 18 hours. This was added to water and the precipitate was recrystallized from a mixture of THF, EtOAc, and ethanol ("EtOH") followed by recrystallization from acetone. Yield: 25 g.

Segment S5

Step 1

Synthesis of 4'-(4'-pentyl[1,1'-bi(cyclohexan)]-4-yl)-[1,1'-biphenyl]-4-ol was accomplished following a procedure similar to Step 2 of Segment 4 above, using the following reagents: product from Step 1 of Segment 4 (30.0 g), (4-hydroxyphenyl)boronic acid (10.0 g), Pd(PPh$_3$)$_4$ (1.50 g), Na$_2$CO$_3$ (18.0 g), and Bu$_4$NI (1.20 g).

Step 2

To a one-neck, round bottom flask containing the product from Step 1 (30.0 g, 74.1 mmol) was added 6-bromohexanol (26.9 g), Bu$_4$NI (1.0 g), K$_2$CO$_3$ (20.5 g), and THF (250 mL). After stirring under reflux overnight, the suspension was added to cold water. The precipitate was filtered. The residue was dissolved in DCM and the aqueous phase removed. The solvent was removed and recrystallized from toluene (300 mL) and EtOAc (200 mL) and washed with cold EtOAc, providing a yield of 17 g of 6-((4'-(4'-pentyl-[1,1'-bi(cyclohexan)]-4-yl)-[1,1'-biphenyl]-4-yl)oxy)hexan-1-ol.

Step 3

The product of step 2 above was subjected to the same reaction conditions described for Segment S2 above to yield Segment S5 (20.0 g).

Segment S6

Step 1

The product of Step 3 from Example 1 of United States Patent Application Publication No. 2017/0275534 A1 (20.0 g), 4-formylbenzoic acid (8.46 g), 4-dimethylaminopyridine ("DMAP," 0.65 g), and DCM (250 mL) was added N,N'-dicyclohexylcarbodiimide ("DCC," 12.1 g). After stirring overnight, the formed dicyclohexylurea was removed and the filtrate passed through a silica plug (eluent was DCM). The resulting solid was dissolved in EtOAc and filtered.

Step 2

To the product of Step 1 (25.0 g) was added KMnO$_4$ (15.6 g, in water), followed by heating at 60° C. in air for 3 hours. After cooling, the reaction mixture was added to water and acidified with 1N HCl. The precipitated product was filtered and washed with water then recrystallized from THF, EtOAc and EtOH. Yield: 22 g.

Segment S7

Step 1

A solution of 4-(3,5-difluorophenyl)-4'-propyl-1,1'-bi(cyclohexane) (15.00 g) in THF (125 mL) was cooled to −75° C. under nitrogen. To this was added n-BuLi (2.50 M, 21.0 mL) slowly. The solution was kept at −78° C. for about 30 minutes before Br$_2$ (3.0 mL) was added slowly. The resulting solution was allowed to warm to room temperature overnight, then washed with aqueous sodium bisulfite. The aqueous layer was extracted with EtOAc (3×50 mL). The combined organic extracts were washed with brine, dried over MgSO$_4$, and filtered through celite to give an off-white solid. Yield: 19.42 g.

Step 2

Synthesis of 2-((2',6'-difluoro-4'-(4'-propyl-[1,1'-bi(cyclohexan)]-4-yl)-[1,1'-biphenyl]-4-yl)oxy)tetrahydro-2H-pyran was accomplished following a procedure similar to Step 2 of Segment S4 above using the following reagents: product of Step 1 (17.23 g); (4-((tetrahydro-2H-pyran-2-yl)oxy)phenyl)boronic acid (10.05 g); K$_2$CO$_3$ (17.90 g); toluene (300 mL); EtOH (100 mL); water (10 mL); and Pd(PPh$_3$)$_4$ (0.99 g).

Step 3

The product from Step 2 was dissolved in a solution of THF/MeOH/EtOH (150 mL/20 mL/20 mL) before HCl (1N, 4.0 mL) was added dropwise. After stirring at room temperature for about 45 minutes, water was added (200 mL). The formed precipitate was collected via filtration and dried under vacuum. Yield: 17.66 g.

Step 4

Synthesis of 6-((2',6'-difluoro-4'-(4'-propyl-[1,1'-bi(cyclohexan)]-4-yl)-[1,1'-biphenyl]-4-yl)oxy)hexan-1-ol was accomplished following a procedure similar to Step 2 of Segment S5 above, using the following reagents: product from Step 3 (17.66 g), 6-chlorohexan-1-ol (22.84 g), K$_2$CO$_3$ (21.29 g), KI (1.77 g) and THF (150 mL). Yield: 16.71 g.

Step 5

The product of Step 4 was subjected to similar reaction conditions as Segment S2 to yield 4-((1-((2',6'-difluoro-4'-(4'-propyl-[1,1'-bi(cyclohexan)]-4-yl)-[1,1'-biphenyl]-4-yl)oxy)butan-2-yl)oxy)-4-oxobutanoic acid.

Segment S8

Step 1

Synthesis of 4-(4-hydroxycyclohexyl)-2/3-methylphenyl 4'-pentyl-[1,1'-bi(cyclohexane)]-4-carboxylate was accomplished following a procedure similar to Step 1 of Segment S6 above, using the following reagents: 4-(4-hydroxycyclohexyl)-2/3-methylphenol (44.1 g), 4'-pentyl-[1,1'-bi(cyclohexane)]-4-carboxylic acid (50.0 g), DCC (40.4 g), DMAP (2.6 g), DCM (500 mL). Yield: 40.0 g.

Step 2

Synthesis of 2/3-methyl-4-(4-((4-((8-((tetrahydro-2H-pyran-2-yl)oxy)octyl)oxy)benzoyl)oxy)cyclohexyl)phenyl 4'-pentyl[1,1'-bi(cyclohexane)]-4-carboxylate was accomplished following a procedure similar to Step 1 of Segment S6 above, using the following reagents: product from Step 1 (30.0 g), 4-((8-((tetrahydro-2H-pyran-2-yl)oxy)octyl)oxy) benzoic acid (25.0 g), DCC (15.8 g), DMAP (1.6 g), DCM (300 mL). Yield: 37.0 g.

Step 3

The product of Step 2 (35.0 g) was suspended in EtOH/THF (100 mL/200 mL) before 4-toluenesulfonic acid ("TsOH," 2.5 g) was added. After refluxing for 3 hours the solution was concentrated and then added to water. The resulting precipitate was filtered, dried, and recrystallized from THF/EtOAc to yield segment 8. Yield: 22.0 g.

Segment S9

Step 1

The procedures of Example 1 from U.S. Patent No. 2017/0275534, were followed, substituting an equimolar amount of 4-((6-((tetrahydro-2H-pyran-2-yl)oxy)hexyl)oxy) cyclohexane-1-carboxylic acid in place of 4-(8-(tetrahydro-2H-pyran-2-yloxy)octyloxy)-benzoic acid in step 7 to yield 4-((4-((6-hydroxyhexyl)oxy)cyclohexane-1-carbonyl)oxy) phenyl 4'-pentyl-[1,1'-bi(cyclohexane)]-4-carboxylate.

Step 2

The product of Step 1 was subjected to the reagents and reaction conditions used in Segment S2 to yield 4-oxo-4-((6-((4-((4'-pentyl-[1,1'-bi(cyclohexane)]-4-carbonyl) oxy)phenoxy)carbonyl)cyclohexyl)oxy)hexyl)oxy)butanoic acid.

TABLE 1

Representative Structures of Mesogen-Containing Segments S1 through S9

| Segment No. | Representative Structure |
|---|---|
| S1 | |
| S2 | |
| S3 | |
| S4 | |
| S5 | |
| S6 | |
| S7 | |
| S8 | |
| S9 | |

Segment S10

4-((4-((6-(Acryloyloxy)hexyl)oxy)benzoyl)oxy)phenyl 4-((8-hydroxyoctyl)oxy)benzoate was prepared using the procedures of Steps 1 through 6 of Example 2 in U.S. Pat. No. 8,349,210 B2, except that 6-chlorohexan-1-ol and 8-chlorohexan-1-ol were used in place of 3-chloropropan-1-ol in Step 1 and 6-chlorohexan-1-ol in Step 3, respectively.

Segment S11

Step 1

4-((4-((6-(Acryloyloxy)hexyl)oxy)benzoyl)oxy)-⅔-methylphenyl 4-((tetrahydro-2H-pyran-2-yl)oxy)benzoate was made in accordance with Step 1 of Segment S6 using the following quantities: 4-hydroxy-⅔-methylphenyl 4-((6-(acryloyloxy)hexyl)oxy)benzoate (12.0 g, 30.0 mmol), 4-((tetrahydro-2H-pyran-2-yl)oxy)benzoic acid (6.7 g), 2-(dimethylamino)pyridinium p-toluenesulfonate ("DPTS," 1.0 g), DCM (300 mL), and DCC (8.2 g,).

Step 2

4-((4-((6-(Acryloyloxy)hexyl)oxy)benzoyl)oxy)-⅔-methylphenyl 4-hydroxybenzoate was made in accordance with Step 3 of Segment S8 using the following materials: product from Step 1, TsOH (0.57 g), DCM (150 mL), MeOH (150 mL).

Step 3

4-((4-((6-(Acryloyloxy)hexyl)oxy)benzoyl)oxy)-⅔-methylphenyl 4-((4-((6-(((tetrahydro-2H-pyran-2-yl)oxy) hexyl)oxy)cyclohexane-1-carbonyl)oxy)benzoate was made in accordance with Step 1 of Segment S11 using the following quantities: product from Step 2 (37.0 g), 4-((6-

((tetrahydro-2H-pyran-2-yl)oxy)hexyl)oxy)cyclohexane-1-carboxylic acid (28.1 g), DCC (19.1 g), DMAP (1.2 g), DCM (500 mL).

Step 4

4-((4-((6-(Acryloyloxy)hexyl)oxy)benzoyl)oxy)-⅔-methylphenyl 4-((4-((6-hydroxyhexyl)oxy)cyclohexane-1-carbonyl)oxy)benzoate was made in accordance with Step 3 of Segment S8 using the following materials: product from Step 3, TsOH (2.7 g), DCM (200 mL), MeOH (200 mL). Yield: 44 g.

Segment S12

Step 1

4-((4-((4-((6-(Acryloyloxy)hexyl)oxy)benzoyl)oxy)-⅔-methylphenoxy)carbonyl)phenyl 4-((6-((tetrahydro-2H-pyran-2-yl)oxy)hexyl)oxy)benzoate was made in accordance with Step 1 of Segment S11 using the following quantities: 4-hydroxy-⅔-methylphenyl 4-((6-(acryloyloxy)hexyl)oxy)benzoate (39.8 g), 4-((4-((6-((tetrahydro-2H-pyran-2-yl)oxy)hexyl)oxy)benzoyl)oxy)benzoic acid (44.3 g), DCC (24.7 g), DMAP (2.4 g), DCM (1 L).

Step 2

4-((4-((4-((6-(Acryloyloxy)hexyl)oxy)benzoyl)oxy)-⅔-methylphenoxy)carbonyl)phenyl 4-((6-hydroxyhexyl)oxy)benzoate was made in accordance with Step 2 of Segment S8 using the following quantities: product from step 1, TsOH (3.8 g), DCM (200 mL), MeOH (200 mL).

Segment S13

4-((4-((8-Hydroxyoctyl)oxy)benzoyl)oxy)phenyl 4-((6-(methacryloyloxy)hexyl)oxy)benzoate was made using the procedures of Steps 1 through 6 of Example 2 in U.S. Pat. No. 8,349,210 B2, except that 6-chlorohexan-1-ol was used in place of 3-chloropropan-1-ol in Step 1, methacrylic acid was used in place of acrylic acid in Step 2, and 8-chlorohexan-1-ol was used in place of 6-chlorohexan-1-ol in Step 3.

Segment S14

4'-(Trans-4-pentylcyclohexyl)-[1,1'-biphenyl]-4]carboxylic acid was prepared in accordance with Example 1, Step 5 in United States Patent Application Publication No. US 2012/0002141 A1.

Segment S15

Trans-4-(((4'-(trans-4-pentylcyclohexyl)-[1,1'-biphenyl]-4-yl)oxy)carbonyl)cyclohexanecarboxylic acid was prepared in accordance with Example 8, Step 2 in United States Patent Application Publication No. US 2012/0002141 A1.

Segment S16

To a one-neck, round bottom flask containing 4-((4-((6-((tetrahydro-2H-pyran-2-yl)oxy)hexyl)oxy)benzoyl)oxy)benzoic acid (8.84 g, 20.0 mmol), 4-hydroxyphenyl 4-((6-hydroxyhexyl)oxy)benzoate (6.60 g), DPTS (0.62 g), DCM (100 mL), and THF (100 mL) was added DCC (5.36 g). After stirring overnight, the formed dicyclohexylurea was filtered away and the filtrate passed through a silica plug (eluent was DCM/EtOAc). The resulting solid was recrystallized from EtOAc (12.3 g, 81%).

TABLE 2

Representative Structures of Mesogen-Containing Segments S10 through S16

| Segment No. | Representative Structure |
|---|---|
| S10 | |
| S11 | |
| S12 | |
| S13 | |
| S14 | |
| S15 | |

TABLE 2-continued

Representative Structures of Mesogen-Containing Segments S10 through S16

| Segment No. | Representative Structure |
|---|---|
| S16 | THPO–(CH$_2$)$_6$–O–C$_6$H$_4$–C(=O)–O–C$_6$H$_4$–C(=O)–O–C$_6$H$_4$–O–C(=O)–C$_6$H$_4$–O–(CH$_2$)$_6$–OH |

Part 1b

Synthesis of Non-Mesogenic Diols

The preparation of non-mesogenic diols D-1 and D-2 is described as follows. Representative structures for diols D-1 and D-2 are provided in Table A.

Diol D-1
Step 1

To a reaction flask containing 6-bromohexyl methacrylate (25.00 g), 2,5-dihyroxybenzoic acid (15.46 g), trimethylamine (Et$_3$N) (10.66 g), and a catalytic amount of 4-methyl-2,6-di-tert-butyl phenol (0.5 g) was added N,N-dimethylformamide ("DMF," 100 mL). After heating at 90° C. for 4 hours, the resulting solution was poured into water (200 mL, 0° C.). After extracting with EtOAc (150 mL×3), the combined organic layer was washed with brine (200 mL×3) and dried over MgSO$_4$. Filtration through a short pad of silica followed by removal of the solvent offered the product in a form of light brown liquid. Yield: 33 g.

Step 2

Synthesis of 6-(methacryloyloxy)hexyl 2,5-bis((6-hydroxyhexyl)oxy)benzoate was accomplished following a procedure similar to Step 2 of Segment S5 above, using the following reagents: product from Step 1 (10.0 g), 6-bromohexan-1-ol (12.3 g), and Bu4NI (2.3 g), butanone (100 mL), and K$_2$CO$_3$ (12.8 g). Yield: 8 g.

Diol D-2
Step 1

Triptycene-1,4-hydroquinone was prepared in accordance with compound 2 from J. Mat. Chem. A, 2014, 2, 13309-13320.

Step 2

Synthesis of 8,8'-(9,10-dihydro-9,10-[1,2]benzenoanthracene-1,4-diyl)bis(oxy))bis(octan-1-ol) was accomplished following a procedure similar to Step 2 of Segment S5 above, using the following reagents: product from Step 1 (30.0 g), 8-chlorooctan-1-ol (51.7 g), KI (3.48 g), DMF (200 mL), and K$_2$CO$_3$ (72.4 g). Yield: 60 g.

TABLE A

| Diol No. | Representative Structure |
|---|---|
| D-1 | CH$_2$=C(CH$_3$)–C(=O)–O–(CH$_2$)$_6$–O–C(=O)–C$_6$H$_3$(–O–(CH$_2$)$_6$–OH)(–O–(CH$_2$)$_6$–OH) |
| D-2 | HO–(CH$_2$)$_4$–O– and HO–(CH$_2$)$_4$–O– substituents on triptycene (9,10-dihydro-9,10-[1,2]benzenoanthracene) |

Part 2.

Synthesis of Mesogen-Containing Compounds

Part 2a:

The reaction of acid-functional mesogen-containing groups/segments with diols to form symmetrical mesogen-containing compounds (Examples 1-16), is described as follows.

The following general procedure was followed. A diol (one molar equivalent), an acid-functional mesogen-containing groups/segments (or acid-functional mesogen intermediates) (2.0 equivalents), TsOH (0.5 equivalents), and DMAP (0.5 equivalents) were combined in DCM sufficient to provide approximately 35% dilution by weight. Once a homogeneous solution was achieved, DCC (2.3 equivalents)

was added in one portion. After stirring overnight under nitrogen, dicyclohexylurea precipitate was removed and the filtrate partially concentrated before being passed through a plug of silica. The material was dissolved in EtOAc and filtered through celite, then precipitated from MeOH/EtOAc to give the desired product. Various combinations of acid functional mesogen intermediates (acid-functional mesogen-containing groups/segments) and diols described as summarized in Table 3, were synthesized by this procedure. $^1$H NMR was used to confirm all product structures as well as the oligomer lengths in purified products.

TABLE 3

| | Acid Functional Mesogen-Containing Segment (2 eq) | Diol (1 eq) | Yield |
|---|---|---|---|
| Example 1 | S2 | Poly(THF) 1000[1] | 91% |
| Example 2 | S2 | Poly(THF) 1400[2] | 62% |
| Example 3 | S2 | Poly(THF) 2000[3] | 69% |
| Example 4 | S9 | Poly(THF) 1000 | 76% |
| Example 5 | S3 | Poly(THF) 1000 | 75% |
| Example 6 | S6 | Poly(THF) 1000 | 66% |
| Example 7 | S7 | Poly(THF) 1000 | 62% |
| Example 8 | S2 | ETERNACOLL® UH100[4] | 38% |
| Example 9 | S2 | ETERNACOLL PH100D[5] | 49% |
| Example 10 | S2 | ETERNACOLL UH200[6] | 95% |
| Example 11 | S2 | Urethane Diol[7] | 73% |
| Example 12 | S2 | Diol D-1 | 49% |
| Example 13 | S2 | cyclohexanediester diol[8] | 77% |
| Example 14 | S2 | perfluoroadipicacid diol[9] | 78% |
| Example 15 | S2 | tetramethylsiloxane diol[10] | 67% |
| Example 16 | S2 | cyclohexylurethane diol[11] | 68% |

[1] A poly tetrahydrofuran with approximate Mn of 1000.
[2] A poly tetrahydrofuran with approximate Mn of 1400.
[3] A poly tetrahydrofuran with approximate Mn of 2000.
[4] A polycarbonate diol with hexyl repeat units, with an approximate Mn of 1000, available from UBE Industries, Ltd.
[5] A polycarbonate diol with hexyl and pentyl repeat units, with an approximate Mn of 1000, available from UBE Industries, Ltd.
[6] A polycarbonate diol with hexyl repeat units, with an approximate Mn of 2000, available from UBE Industries, Ltd.
[7] A urethane diol was prepared by reacting three equivalents of 1,6-hexanediol with two equivalents of 2,2,4-trimethylhexamethylene diisocyanate in the presence of a tin catalyst.
[8] A cyclohexanediester diol was prepared by reacting four equivalents of 1,10-decanediol with three equivalents of trans-cyclohexane-1,4-dicarboxylic acid in the presence of a tin catalyst.
[9] A perfluoroadipicacid diol was prepared by reacting four equivalents of 1,10-decanediol with three equivalents of perfluoroadipic acid in the presence of a tin catalyst.
[10] A tetramethylsiloxane diol was prepared by reacting three equivalents of 3,3'-(1,1,3,3-tetramethyldisiloxane-1,3-diyl)bis(propan-1-ol) with two equivalents of adipoyl chloride in the presence of Et$_3$N and DMAP.
[11] A cyclohexylurethane diol was prepared by reacting three equivalents of 1,10-decanediol with four equivalents of isophorone diisocyanate in the presence of a tin catalyst.

Part 2b.

Additional mesogen-containing compounds (Examples 17-21) were prepared in accordance with the following general procedure. A diol compound (1 equivalent) was dissolved in DCM along with ε-caprolactone in the molar ratios as summarized in Table 4. To this was added diphenyl phosphate (DPP) (0.5 equivalents) and the mixture was stirred under nitrogen for 4-8 hours (or until the required number of caprolactone units has been reached) to form a polyester diol, which was then reacted with the acid functional mesogen Segment S2 (2.05 equivalents) under the conditions described in Part 2a above. The components, equivalent ratios, and yields are summarized in Table 4. $^1$H NMR analysis was used to confirm all product structures as well as the oligomer lengths in the purified products.

TABLE 4

| | Diol (1 equivalent) | ε-caprolactone equivalents | Segment S2 (equivalents) | Yield |
|---|---|---|---|---|
| Example 17 | 1,6-hexanediol | 8.0 | 2.05 | 51% |
| Example 18 | Tetraethyleneglycol | 6.0 | 2.1 | 25% |
| Example 19 | Poly(THF) 1000 | 5.0 | 2.5 | 57% |
| Example 20 | Diol D-1 | 6.0 | 2.2 | 46% |
| Example 21 | Diol D-2 | 6.0 | 2.3 | 48% |

Part 2c.

Mesogen-containing compounds (Examples 22-24) with polyester segments (or linking groups) were prepared by combining two equivalents of the hydroxyl functional mesogen Segment S1 with ε-caprolactone in DCM followed by addition of DPP (1 equivalent). The mixture was stirred for four hours, followed by addition of a diacid compound (1 equivalent), DMAP (1 equivalent) and DCC (3 equivalent). After stirring overnight, dicyclohexylurea precipitate was removed and the product purified by precipitation from a mixture of EtOAc and MeOH (1:8 v/v). Reagents and molar ratios used for this reaction series are summarized in Table 5. $^1$H NMR was used to confirm all product structures as well as the oligomer lengths in the purified products.

TABLE 5

| | Segment S1 Equivalents | ε-caprolactone equivalents | Diacid (1 eq) | Yield |
|---|---|---|---|---|
| Example 22 | 2 | 8 | 4,4'-(1,1,3,3-tetramethyldisiloxane-1,3-diyl)dibutyric acid | 48% |
| Example 23 | 2 | 8 | 7,7,9,9,10,10,12,12,13,13,15,15-dodecafluoro-4,18-dioxo-5,8,11,14,17-pentaoxa-henicosanedioic acid | 62% |
| Example 24 | 2 | 8 | 4,4'-((2,2,3,3,4,4,5,5-octafluorohexane-1,6-diyl)bis(oxy))bis(4-oxobutanoic acid) | 94% |

Mesogen-containing compounds (Examples 25-40) with polyester or polycarbonate segments (or linking groups) were also prepared in a stepwise manner. A hydroxy functional mesogen segment (1 equivalent) was combined with a lactone or cyclic carbonate in DCM followed by addition of DPP (0.5 equivalent). The mixture was stirred for three hours, followed by addition of an acid functional mesogen segment (1 equivalent), DMAP (0.5 equivalent) and DCC (1 equivalent). After stirring overnight, dicyclohexylurea precipitate was removed and the product purified by filtering through celite and precipitation from MeOH. Reagents and molar ratios used for this reaction series are summarized in Table 6. $^1$H NMR was used to confirm all product structures as well as the oligomer lengths in the purified products.

TABLE 6

| | Hydroxy functional Mesogen Segment (1 eq) | Lactone or carbonate | Equivalents of lactone or carbonate | Acid functional Mesogen Segment (1 eq) | Yield |
|---|---|---|---|---|---|
| Example 25 | S10 | ε-caprolactone | 4 | S2 | 46% |
| Example 26 | S10 | ε-caprolactone | 8 | S2 | 95% |

TABLE 6-continued

| | Hydroxy functional Mesogen Segment (1 eq) | Lactone or carbonate | Equivalents of lactone or carbonate | Acid functional Mesogen Segment (1 eq) | Yield |
|---|---|---|---|---|---|
| Example 27 | S10 | ε-caprolactone | 12 | S2 | 92% |
| Example 28 | S13 | ε-caprolactone | 8 | S2 | 83% |
| Example 29 | S11 | ε-caprolactone | 9 | S2 | 66% |
| Example 30 | S12 | ε-caprolactone | 8 | S2 | 89% |
| Example 31 | S10 | ε-caprolactone | 8 | S3 | 83% |
| Example 32 | S10 | ε-caprolactone | 8 | S4 | 22% |
| Example 33 | S10 | ε-caprolactone | 8 | S5 | 61% |
| Example 34 | S10 | ε-caprolactone δ-valerolactone | 4 4 | S2 | 49% |
| Example 35 | S10 | trimethylene carbonate | 10 | S2 | 29% |
| Example 36 | S1 | trimethylene carbonate | 9 | S2 | 86% |
| Example 37 | S1 | ε-caprolactone | 9 | S14 | 77% |
| Example 38 | S1 | ε-caprolactone | 9 | S15 | 69% |
| Example 39 | S1 | ε-caprolactone | 8 | S2 | 40% |
| Example 40 | S8 | ε-caprolactone | 8 | S2 | 52% |

Example 41

A further mesogenic compound according to the present invention was prepared as follows.
Step 1
To a one-neck, round bottom flask containing Segment S1 (50.0 g), DCM (250 mL), ε-caprolactone (36.75 g), was added DPP (6.0 g) and stirred under nitrogen for 4 hours. The solution was washed with NaHCO$_3$ (saturated, 2×250 mL) and brine (1×250 ml), then dried over anhydrous MgSO$_4$. The solution was filtered and concentrated. The crude product was precipitated using EtOAc and hexanes at −10° C. Yield: 76 g.
Step 2
The product of step 1 above was subjected to the same reaction conditions described for Segment S2 above.
Step 3
The product of Step 2 (8.0 g) was subjected to similar reaction conditions as Step 1 of Segment S6 using the following reagents: 1,8-dihydroxynaphthalene (0.50 g), DCC (1.6 g), DMAP (0.19 g), TsOH (0.3 g), DCM (200 mL). The crude product was precipitated using ethyl acetate and methanol and dried. Yield: 3.5 g.

Example 42

An additional mesogenic compound according to the present invention was prepared as follows.
Step 1
The product from Step 1 was made in accordance with Examples 24-39 using the following reagents: Segment S1 (30.0 g), DPP (6.0 g), ε-caprolactone (27.5 g), DCM (100 mL), 3-(allyloxy)propionic acid (8.0 g), DCC (15.0 g), DMAP (2.95 g). Yield: 50.0 g.
Step 2
To a nitrogen purged schlenk tube was added the product from Step 1 (15.0 g), polyphenylmethylsiloxane (PMS-H11, 5.7 g) and toluene (25 mL). Karsted's catalyst (5 drops, 2% Pt in xylenes) was added, the schlenk tube was covered with aluminum foil, and the outlet sealed with a rubber cork. After stirring for 5 days, the solvent was removed and the resultant crude product dissolved in DCM before being chromatographed (eluent was 60% EtOAc in DCM). The product was dissolved in EtOAc (60 mL), filtered, and then concentrated to ~36 mL. The solution was precipitated by pouring into MeOH (180 mL, 0° C.). The solid was filtered, washed with MeOH (200 mL), and dried under vacuum. Yield: 10 g.

Comparative Example CE-43

1-{3-(4-(3-(4-(6-(4-(4-(trans-4-propylcyclohexyl)phenoxycarbonyl)phenoxy)hexyloxy)-4-oxobutanoyloxy)propyloxy)benzoyloxy)propyloxy}-4-{6-(4-(4-(trans-4-propylcyclohexyl)phenoxycarbonyl)phenoxy)hexyloxy}butane-1,4-dione, was prepared in accordance with Example 1 from U.S. Pat. No. 8,628,685 B2.

Comparative Example CE-44

1,4-bis-{(6-(6-(6-(6-(6-(6-(trans-4-(4-(6-acryloyloxyhexyloxy)benzoyloxy)phenyl)cyclohexyloxy)hexyloxy)-6-oxohexyloxy)-6-oxohexyloxy)-6-oxohexyloxy)-6-oxohexyloxy}butan-1,4-dione, was prepared in accordance with Example 3 from U.S. Pat. No. 7,910,020 B2.

Representative structures of the mesogen-containing compounds of Examples 1-42 and Comparative Examples CE-43 and CE-44 are provided in the following Table 7.

TABLE 7
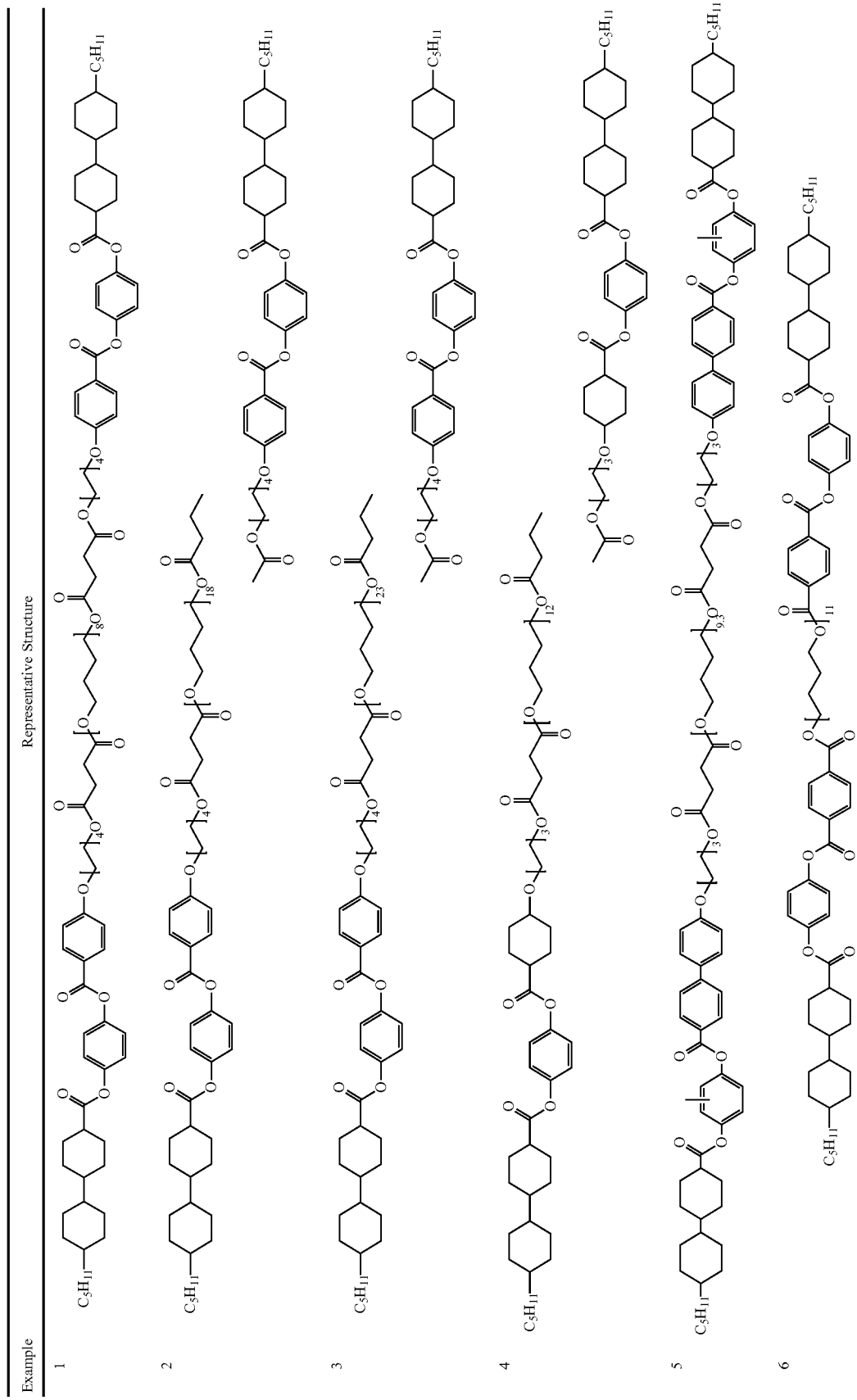

TABLE 7-continued

| Example | Representative Structure |
|---|---|
| 7 | |
| 8 | |
| 9 | |
| 10 | |
| 11 | |

TABLE 7-continued

| Example | Representative Structure |
|---------|--------------------------|
| 12 | |
| 13 | |
| 14 | |
| 15 | |

TABLE 7-continued

Representative Structure

| Example | Representative Structure |
|---|---|
| 16 | |
| 17 | |
| 18 | |
| 19 | |

TABLE 7-continued

| Example | Representative Structure |
|---|---|
| 20 | |
| 21 | |
| 22 | |
| 23 | |

TABLE 7-continued

| Example | Representative Structure |
|---|---|
| 24 | |
| 25 | |
| 26 | |
| 27 | |
| 28 | |
| 29 | |
| 30 | |

TABLE 7-continued

| Example | Representative Structure |
|---------|--------------------------|
| 31 | |
| 32 | |
| 33 | |
| 34 | |
| 35 | |
| 36 | |
| 37 | |
| 38 | |

TABLE 7-continued

| Example | Representative Structure |
|---|---|
| 39 | |
| 40 | |
| 41 | |
| 42 | |
| CE-43 | |

TABLE 7-continued
| Example | Representative Structure |
|---|---|
| CE-44 | 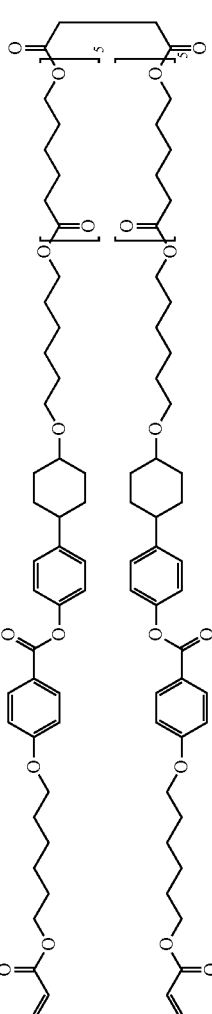 |

Part 3.
Liquid Crystal Coating Formulations
Part 3a.
Preparation of Standard Liquid Crystal Coating Formulation In suitable containers equipped with a stir bar, the first three ingredients, listed in Table 8, were charged and stirred at room temperature until a homogeneous solution was obtained. Then the mixture of photochromic dichroic dyes was charged and the resulting mixture was stirred for 1 hour at 90° C. The liquid crystal monomers were then charged and the solution stirred for an additional hour at 90° C. The temperature of the solution was then reduced to 60° C. and IRGACURE 819 photoinitiator was added to the solution and the mixture was stirred for 30 minutes to obtain the final solution.

TABLE 8

Standard Liquid Crystal Coating (LCC) Formulation

| Component | Amount (parts by weight) |
| --- | --- |
| Anisole | 1.995 |
| BYK ®-322[1] | 0.002 |
| 4-Methoxyphenol | 0.003 |
| Photochromic dichroic dyes[2] | 0.36 |
| RM257[3] | 1.26 |
| LCM-2[4] | 0.66 |
| LCM-3[5] | 0.54 |
| LCM-4[6] | 0.54 |
| IRGACURE ® 819[7] | 0.045 |

[1]An aralkyl modified poly-methyl-alkyl-siloxane available from BYK Chemie, USA.
[2]A mixture of five photochromic-dichroic indenofused naphthopyran dyes formulated to give a grey color on activation.
[3]A liquid crystal monomer 4-(3-acryloyloxypropyloxy)-benzoic acid 2-methyl-1,4-phenylene ester, available commercially from EMD Chemicals, Inc.
[4]4-((4-((8-((6-((6-((6-((6-((6-((6-(methacryloyloxy)hexanoyl)oxy)hexanoyl)oxy) hexanoyl)oxy) hexanoyl)oxy) hexanoyl)oxy) hexanoyl)oxy) hexanoyl)oxy) octyl)oxy)benzoyl)oxy)phenyl 4'-pentyl-[1,1'-bi(cyclohexane)]-4-carboxylate, prepared according to procedures described in U.S Pat. No. 7,910,019B2.
[5]1-(6-(6-(6-(6-(6-(6-(6-(8-(4-(4-(4-(6-acryloyloxyhexyloxy)benzoyloxy)phenoxycarbonyl)phenoxy)octyloxy)-6-oxohexyloxy)-6-oxohexyloxy)-6-oxohexyloxy)-6-oxohexyloxy)-6-oxohexyloxy)-6-oxohexyloxy)-6-oxohexanol, prepared in accordance with Example 17 in U.S. Pat. No. 7,910,019 B2.
[6]3-methyl-4-((4-pentylcyclohexane-1-carbonyl)oxy)phenyl 4-((6-(acryloyloxy)hexyl)oxy)benzoate.
[7]A photoinitiator available from BASF.

Part 3b.
Preparation of Liquid Crystal Coating Formulations Including Mesogen-Containing Compounds:

Liquid crystal coating formulations including mesogen-containing compounds were prepared by adding certain mesogen-containing compounds to the Standard Liquid Crystal Coating Formulation described in Part 3a. The mixtures were prepared as summarized in the following Table 9, where each mesogen-containing compound was added to 5.4 parts Standard Liquid Crystal Coating Formulation. The components were combined and stirred at 80° C. for 1 hour to achieve a homogeneous solution. The additive quantities are calculated based on 4.4 mol % of liquid crystal monomers. Anhydrous magnesium sulfate was then added into the solution followed by stirring at room temperature for 30 minutes. Magnesium sulfate was then filtered away by centrifuging and the filtrate was used for spin coating.

TABLE 9

| Example | Mesogen-Containing Compound | Parts by weight of Mesogen-Containing Compound |
| --- | --- | --- |
| Example 45 | Example 1 | 0.342 |
| Example 46 | Example 8 | 0.409 |
| Example 47 | Example 22 | 0.434 |
| Example 48 | Example 24 | 0.469 |
| Example 49 | Example 40 | 0.399 |
| Example 50 | Example 12 | 0.333 |
| Example 51 | Example 26 | 0.375 |
| Example 52 | Example 30 | 0.403 |
| Example 53 | Example 31 | 0.388 |
| Example 54 | Example 32 | 0.325 |
| CE-55 | CE-43 | 0.222 |
| CE-56 | CE-44 | 0.384 |
| CE-57 | None | None |

Part 4.
Preparation of Coated Substrates

The following procedure was used to form coated substrates (test specimens). Each liquid crystal coating formulation described in Part 3 (Table 9) was spin coated at a rate of 400 revolutions per minute (rpm) for 6 seconds, followed by 1250 rpm for 6 seconds onto CR-39 ® lens substrates having an alignment layer. Each coated substrate was placed in an oven at 60-75° C. for 30 minutes to facilitate alignment, after which they were cured under two ultraviolet lamps in a UV curing oven designed and built by Belcan Engineering under nitrogen while running on a conveyor belt at 2 ft/min (61 cm/min) speed at peak intensity of 0.388 Watts/cm$^2$ of UVA and 0.165 Watts/cm$^2$ of UVV; and UV dosage of 7.386 Joules/cm$^2$ of UVA and 3.337 Joules/cm$^2$ of UVV.

Part 5.
Photochromic Performance Testing Including Absorption Ratio and Optical Response Measurements Prior to response testing on an optical bench, the test specimens were conditioned in a multistep custom built conditioning unit. First they were exposed to 365 nm ultraviolet light for 10 minutes at a distance of about 10 cm from the source of electromagnetic radiation, in order to pre-activate the photochromic compounds. The UVA irradiance at the sample was measured to be 7.7 Watts per square meter. Next, the test specimens were heated to and held at 70° F. (21.1° C.) for 10 minutes. Finally, the heating element was turned off and F17T8 Yellow Halogen lights were turned on for 30 minutes in order to bleach, or inactivate, the photochromic compounds in the test specimens. The illuminance from the yellow halogen lights at the test specimen was measured to be 9.0 Klux. The test specimens were then kept in a dark environment for at least 1 hour prior to testing in order to cool and continue to fade back to a ground state.

An optical bench was used to measure the optical properties of the test specimens and derive the absorption ratio and photochromic properties. Each test specimen was placed on the optical bench with an activating light source positioned at a 30° to 35° angle of incidence to the surface of the test sample. The activating light source used was a Xenon Arc Lamp powered by a Newport/Oriel Model 69911 300-Watt power supply fitted with a UNIBLITZ® VS-25 high-speed computer controlled shutter that momentarily closed during data collection so that stray light would not interfere with the data collection process, a SCHOTT® 3 mm KG-2 heat absorbing filter, which removed short wavelength radiation, neutral density filter(s) for intensity attenuation and a condensing lens for beam collimation. The arc lamp was equipped with a Digital Exposure Controller and sensor (Newport/Oriel model 68945) in order to maintain fine control of the output over time.

A broadband light source for monitoring response measurements was positioned in a perpendicular manner to the surface of the test specimen. Increased signal of shorter visible wavelengths was obtained by collecting and combining separately filtered light from a 100-Watt tungsten halogen lamp (controlled by a LAMBDA® ZUP60-14 constant voltage power supply) with a split-end, bifurcated fiber optical cable. Light from one side of the tungsten halogen lamp was filtered with a SCHOTT® KG1 filter to absorb heat and a HOYA® B-440 filter to allow passage of the shorter wavelengths. The other side of the light was either filtered with a SCHOTT® KG1 filter or unfiltered. The light was collected by focusing light from each side of the lamp onto a separate end of the split-end, bifurcated fiber optic cable, and subsequently combined into one light source emerging from the single end of the cable. A 4 to 6 inch (10.2 to 15.25 cm) light pipe was attached to the single end of the cable to insure proper mixing. The broad band light source was fitted with a UNIBLITZ® VS-25 high-speed computer controlled shutter that momentarily opened during data collection.

Polarization of the light source was achieved by passing the light from the single end of the cable through a Moxtek, PROFLUX® Polarizer held in a computer driven (analyzer polarizer), motorized rotation stage (Model M-061.PD, M660, U651 or equivalent from Physik Instrumente). The monitoring beam was set so that the one polarization plane) (0° was perpendicular to the plane of the optical bench table and the second polarization plane)(90° was parallel to the plane of the optical bench table. The test specimens were run in air, at 23° C.±0.1° C. (which temperature was maintained by a temperature controlled air cell).

To align the test specimens prepared in Part 4, a second polarizer was added to the optical path (research grade film polarizer, such as a polarizer from OptoSigma, SPF-50C-32). The second polarizer was set to 90° (+/−0.1 degrees) of the first analyzer polarizer. The sample was placed in an air cell in a self-centering holder mounted on a rotation stage (Model M-061.PD, M660, U651 or equivalent from Physik Instrumente). A laser beam (Coherent -ULN 635 diode laser) was directed through the crossed polarizers and sample. The signal intensity of the laser beam was measured, in relative counts by the spectrophotometer. The test specimen was rotated 120 degrees in 3 degree increments in order to locate a minimum transmitted light intensity of the laser beam. The test specimen was then positioned near the minimum transmitted light intensity and then the test specimen was rotated 12 degrees in 0.1 degree steps in order to locate the minimum transmission to +/−0.1 degrees, depending upon the sample quality. The test specimen was then finally positioned at the minimum transmission angle. At this point the test specimen was aligned either parallel or perpendicular to the Moxtek analyzer polarizer. The second polarizer and the diode laser beam were removed from the optical path. Using this process, test specimens were aligned to ±0.1 degrees prior to any activation.

To conduct the measurements, each test specimen was exposed to roughly 6.7 W/m² of UVA from the activating light source for 15 minutes to activate the photochromic compounds. An International Light Research Radiometer (Model ILT950(FC) with a detector system was used to verify exposure at the beginning of each day. Light from the monitoring source that was polarized to the 0° polarization plane was then passed through the sample and focused into a 1 inch (2.54 cm) integrating sphere, which was connected to an OCEAN OPTICS® S2000 spectrophotometer using a single function fiber optic cable. The spectral information, after passing through the sample, was collected using OCEAN OPTICS Drivers in conjunction with propriety software from Transitions Optical, Ltd. While the photochromic material was activated, the position of the polarizer was rotated back and forth to polarize the light from the monitoring light source to the 90° polarization plane and back. Data was collected for approximately 600 to 1200 seconds at 5 second intervals during activation. For each test, rotation of the polarizers was adjusted to collect data in the following sequence of polarization planes: 0°, 90°, 90°, 0°, etc.

Absorption ratio (AR) is the ratio of absorbance measured at 90° polarization (perpendicular orientation with the analyzer polarizer, minimum transmission) and 0° polarization (parallel orientation with the analyzer polarizer, maximum transmission).

Change in optical density ($\Delta OD$) from the bleached state (unactivated state) to the darkened state (activated state) was determined by establishing the initial transmittance, opening the shutter from the xenon lamp to provide ultraviolet radiation to change the test specimen from the bleached state to an activated state. Data was collected at selected intervals of time, measuring the transmittance in the activated state, and calculating the change in optical density according to the formula: $\Delta OD=\log(\% \text{ Tb}/\% \text{ Ta})$, where % Tb is the percent transmittance in the bleached state, % Ta is the percent transmittance in the activated state and the logarithm is to the base 10.

The fade half-life (T½) is the time interval in seconds for the $\Delta OD$ of the activated form of the photochromic compounds in the test specimens to reach one half the $\Delta OD$ measured after fifteen minutes, or after saturation or near-saturation was achieved, at room temperature after removal of the source of activating light, e.g., by closing the shutter.

The photochromic performance test results (absorption ratio and fade half-life) obtained from the Examples according to the present invention and Comparative Examples (CE) are summarized in the following Table 10.

TABLE 10

Photochromic Performance Test Results

| Example | AR | Fade ($T_{1/2}$) |
|---|---|---|
| Example 45 | 6.9 | 198 |
| Example 46 | 6.5 | 188 |
| Example 47 | 7.4 | 186 |
| Example 48 | 7.3 | 195 |
| Example 49 | 6.6 | 202 |
| Example 50 | 5.8 | 280 |
| Example 51 | 5.6 | 196 |
| Example 52 | 5.3 | 182 |
| Example 53 | 5.6 | 205 |
| Example 54 | 5.6 | 201 |
| CE-55 | 4.8 | 244 |
| CE-56 | 4.8 | 237 |
| CE-57 | 4.7 | 239 |

The results summarized in Table 10 above demonstrate that a coating layer including a mesogen-containing compound according to the present invention provides improved dichroic properties in the activated state (as indicated by AR values of greater magnitude), as compared to: the comparative examples which do not include a mesogen-containing compound having a terminal R-substituted dicyclohexyl group (CE-55 and CE-56); and the comparative example that does not include a mesogen-containing compound (CE-57). Improved dichroic properties were observed with mesogen-containing compounds according to the present invention having: two terminal R-substituted dicyclohexyl groups (Examples 45-50); and a single terminal R-substituted dicyclohexyl group and a single terminal acrylate group (Examples 51-54). In addition, mesogen-containing compounds according to the present invention were observed to provide improved fade half-life values (Examples 45-49 and Examples 51-54) as compared to Comparative Examples CE-55, CE-56, and CE-57.

The present invention has been described with reference to specific details of particular embodiments thereof. It is not intended that such details be regarded as limitations upon the scope of the invention except insofar as to the extent that they are included in the accompanying claims.

What is claimed is:

1. A mesogen-containing compound represented by the following Formula (I),

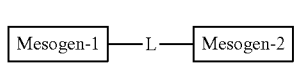
(I)

wherein:
(A) Mesogen-1 is represented by the following Formula (II),

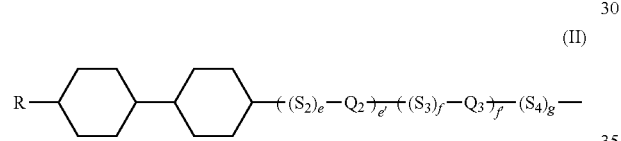
(II)

wherein:
R is alkyl; and
e' and f' for each occurrence for Formula (II) are independently from 0 to 2, provided the sum of e' and f' is 2;
(B) Mesogen-2 is represented by Formula (II) of Mesogen-1,
wherein independently for each Formula (II),
(i) $Q_2$ and $Q_3$ for each occurrence are independently a divalent group selected from unsubstituted or substituted aryl; wherein the aryl substituents, are each independently selected from alkyl and halogen;
(ii) S2, S3, and S4 for each occurrence are independently selected from a spacer unit chosen from —O—; and —C(O)—; and
(iii) e, f, and g for each occurrence are independently 0 to 2, provided that when two spacer units comprising heteroatoms are linked together the spacer units are linked so that heteroatoms are not directly linked to each other;
(C) -L- is represented by the following Formula (IV),

(IV)

wherein:
(i) y is 1 to 30;
(ii) each A independently for each y is a divalent group selected from the group consisting of aliphatic group and haloaliphatic group;
(iii) each B independently for each y is a divalent group selected from the group consisting of —O—; and —C(O)O—; and (iv) E is a divalent group selected from the group consisting of aliphatic group.

2. The mesogen-containing compound of claim 1, wherein:
independently for each Formula (II),
$Q_2$ and $Q_3$ for each occurrence are independently a divalent group selected from the group consisting of unsubstituted or substituted phenyl; wherein the phenyl substituents, are each independently selected from alkyl and halogen.

3. The mesogen-containing compound of claim 2, wherein:
independently for each Formula (II),
$Q_2$ and $Q_3$ for each occurrence are independently a divalent group selected from the group consisting of unsubstituted or substituted 1,4-phenyl; wherein the 1,4-phenyl substituents, are each independently selected from alkyl and halogen.

4. The mesogen-containing compound of claim 3, wherein:
(A) for Formula (II),
R is selected from hydrogen and alkyl;
(C) for Formula (IV),
(ii) each A independently for each y is a divalent group selected from the group consisting of alkyl;
(iii) each B independently for each y is a divalent group selected from the group consisting of —O—; and —C(O)O—; and
(iv) E is a divalent group selected from the group consisting of alkyl groups.

5. The mesogen-containing compound of claim 1, wherein Mesogen-1 and Mesogen-2 are the same.

6. The mesogen-containing compound of claim 1, wherein -L- comprises at least 20 bonds.

7. A liquid crystal composition comprising the mesogen-containing compound of claim 1.

8. The liquid crystal composition of claim 7, further comprising at least one of a photochromic compound, a dichroic compound, and a photochromic-dichroic compound.

9. The liquid crystal composition of claim 8, wherein said photochromic-dichroic compound comprises at least one photochromic moiety, and said photochromic compound and each photochromic moiety of said photochromic-dichroic compound are in each case independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, non-thermally reversible photochromic compounds, and mixtures thereof.

10. An optical element comprising:
a substrate; and
a layer on at least a portion of a surface of said substrate, wherein said layer comprises the mesogen-containing compound of claim 1.

11. The optical element of claim 10, further comprising an alignment layer interposed between said substrate and said layer, wherein said alignment layer is at least partially alignable by exposure to at least one of a magnetic field, an electric field, linearly polarized radiation, shear force, or combinations of two or more thereof.

12. The optical element of claim 10, wherein said optical element is selected from a display element, a window, a mirror, a liquid crystal cell element, and an ophthalmic element, preferably selected from a corrective lens, a non-corrective lens, a contact lens, an intra-ocular lens, a magnifying lens, a protective lens, and a visor.
13. The mesogen-containing compound of claim 1, wherein said mesogen compound comprises at least one of the following Formulas (A), (B), or (C),
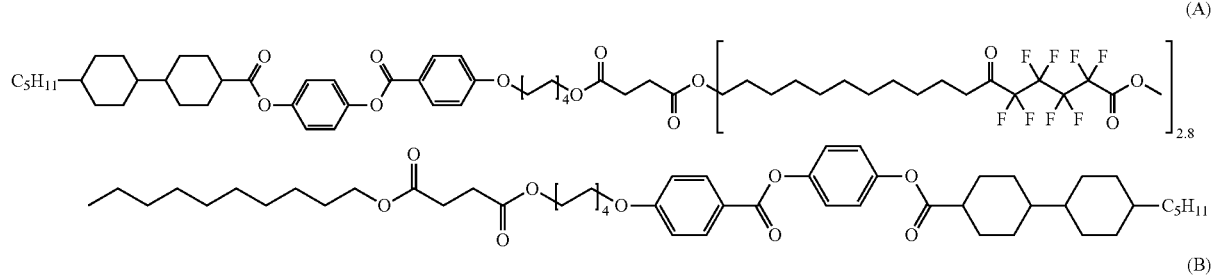
(A)
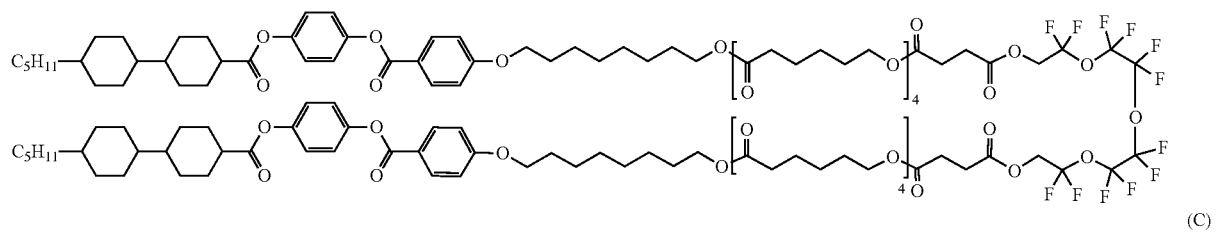
(B)
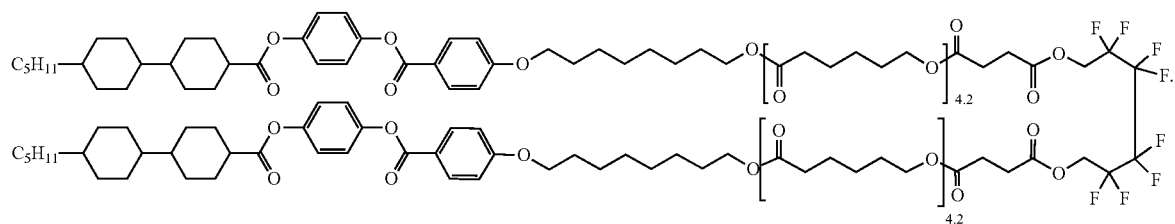
(C)
* * * * *

UNITED STATES PATENT AND TRADEMARK OFFICE
CERTIFICATE OF CORRECTION

Page 1 of 1

PATENT NO.         : 12,234,402 B2
APPLICATION NO.    : 18/234415
DATED              : February 25, 2025
INVENTOR(S)        : Ramaiahgari Reddy et al.

It is certified that error appears in the above-identified patent and that said Letters Patent is hereby corrected as shown below:

On the Title Page

Column 1, Related U.S. Application Data, Line 1, below "11,773,326." as a new field entry, insert item (30) -- Foreign Application Priority Data
Dec. 10, 2018 (WO)...............PCT/EP2018/084127 --

In the Claims

Column 61, Line 49, Claim 1, delete "S2, S3, and S4" and insert -- $S_2$, $S_3$, and $S_4$ --

Signed and Sealed this
Fifth Day of August, 2025

Coke Morgan Stewart
*Acting Director of the United States Patent and Trademark Office*